US012647172B2

(12) United States Patent
Zheng et al.

(10) Patent No.: US 12,647,172 B2
(45) Date of Patent: Jun. 2, 2026

(54) BEAM RECOVERY DURING MULTI-TRANSMISSION-RECEPTION POINT (TRP) OPERATION

(71) Applicant: QUALCOMM Incorporated, San Diego, CA (US)

(72) Inventors: Ruiming Zheng, Beijing (CN); Linhai He, San Diego, CA (US); Yan Zhou, San Diego, CA (US); Tao Luo, San Diego, CA (US); Mostafa Khoshnevisan, San Diego, CA (US); Xiaoxia Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 18/044,612

(22) PCT Filed: Oct. 30, 2020

(86) PCT No.: PCT/CN2020/125116
§ 371 (c)(1),
(2) Date: Mar. 9, 2023

(87) PCT Pub. No.: WO2022/088009
PCT Pub. Date: May 5, 2022

(65) Prior Publication Data
US 2023/0363033 A1 Nov. 9, 2023

(51) Int. Cl.
*H04B 7/06* (2006.01)
*H04B 7/024* (2017.01)
(Continued)

(52) U.S. Cl.
CPC ....... *H04B 7/06964* (2023.05); *H04B 7/0639* (2013.01); *H04B 7/088* (2013.01);
(Continued)

(58) Field of Classification Search
CPC .... H04W 76/19; H04W 76/15; H04B 7/0639; H04B 7/0695; H04B 7/088; H04B 7/024; H04L 5/0035; H04L 5/0023; Y02D 30/70
See application file for complete search history.

(56) References Cited

U.S. PATENT DOCUMENTS

2020/0113010 A1    4/2020  Wilson et al.
2021/0050968 A1*   2/2021  Yi ......................... H04L 5/0051
(Continued)

FOREIGN PATENT DOCUMENTS

CA        3127395 A1      7/2020
CN      111278122 A       6/2020
(Continued)

OTHER PUBLICATIONS

Supplementary European Search Report—EP20959171—Search Authority—Munich—Jul. 1, 2024.
(Continued)

*Primary Examiner* — Harry H Kim
(74) *Attorney, Agent, or Firm* — Harrity & Harrity, LLP

(57) ABSTRACT

Various aspects of the present disclosure generally relate to wireless communication. In some aspects, a user equipment (UE) may detect a beam failure associated with a first beam utilized to communicate with a first transmission-reception point (TRP) associated with a multi-TRP operation. The UE may perform beam recovery, to address the beam failure, utilizing a network resource associated with a second TRP associated with the multi-TRP operation. Numerous other aspects are provided.

30 Claims, 15 Drawing Sheets

400 →

TRP A
405
((φ))

Backhaul
Coordination

TRP B
405
((φ))

PDCCH
(e.g., Mode 1
or Mode 2)

PDSCH
(same or
different)

PDCCH
(e.g., Mode 2)

120

(51) Int. Cl.

| | | |
|---|---|---|
| *H04B 7/08* | (2006.01) | |
| *H04L 5/00* | (2006.01) | |
| *H04W 76/15* | (2018.01) | |
| *H04W 76/19* | (2018.01) | |

(52) U.S. Cl.
CPC ........... *H04L 5/0035* (2013.01); *H04W 76/15* (2018.02); *H04W 76/19* (2018.02)

(56) References Cited

U.S. PATENT DOCUMENTS

| | | | | |
|---|---|---|---|---|
| 2022/0046441 A1* | 2/2022 | Agiwal | ................. | H04L 5/0035 |
| 2022/0117024 A1* | 4/2022 | Saber | ..................... | H04B 7/024 |
| 2023/0138282 A1* | 5/2023 | Guo | ....................... | H04B 7/088 |
| | | | | 370/216 |
| 2023/0199584 A1* | 6/2023 | Xu | ....................... | H04B 7/0695 |
| | | | | 455/436 |
| 2023/0246759 A1* | 8/2023 | Yuan | .................... | H04B 7/0632 |
| | | | | 370/329 |
| 2023/0413080 A1* | 12/2023 | Matsumura | ........... | H04W 76/10 |
| 2024/0023130 A1* | 1/2024 | Schober | .............. | H04W 52/028 |
| 2025/0151149 A1* | 5/2025 | Tsai | ....................... | H04B 7/024 |

FOREIGN PATENT DOCUMENTS

| | | |
|---|---|---|
| CN | 111435845 A | 7/2020 |
| CN | 111818641 A | 10/2020 |
| WO | 2018143391 A1 | 8/2018 |
| WO | 2018190617 A1 | 10/2018 |
| WO | 2020010630 A1 | 1/2020 |

OTHER PUBLICATIONS

International Search Report and Written Opinion—PCT/CN2020/125116—ISA/EPO—Jul. 20, 2021.

* cited by examiner

TCI state for downlink communications

510

510-a

505

505

505-A

505

Spatial relation for uplink communications

515

515-a

520

520

520-A

520

110

110

120

120

500

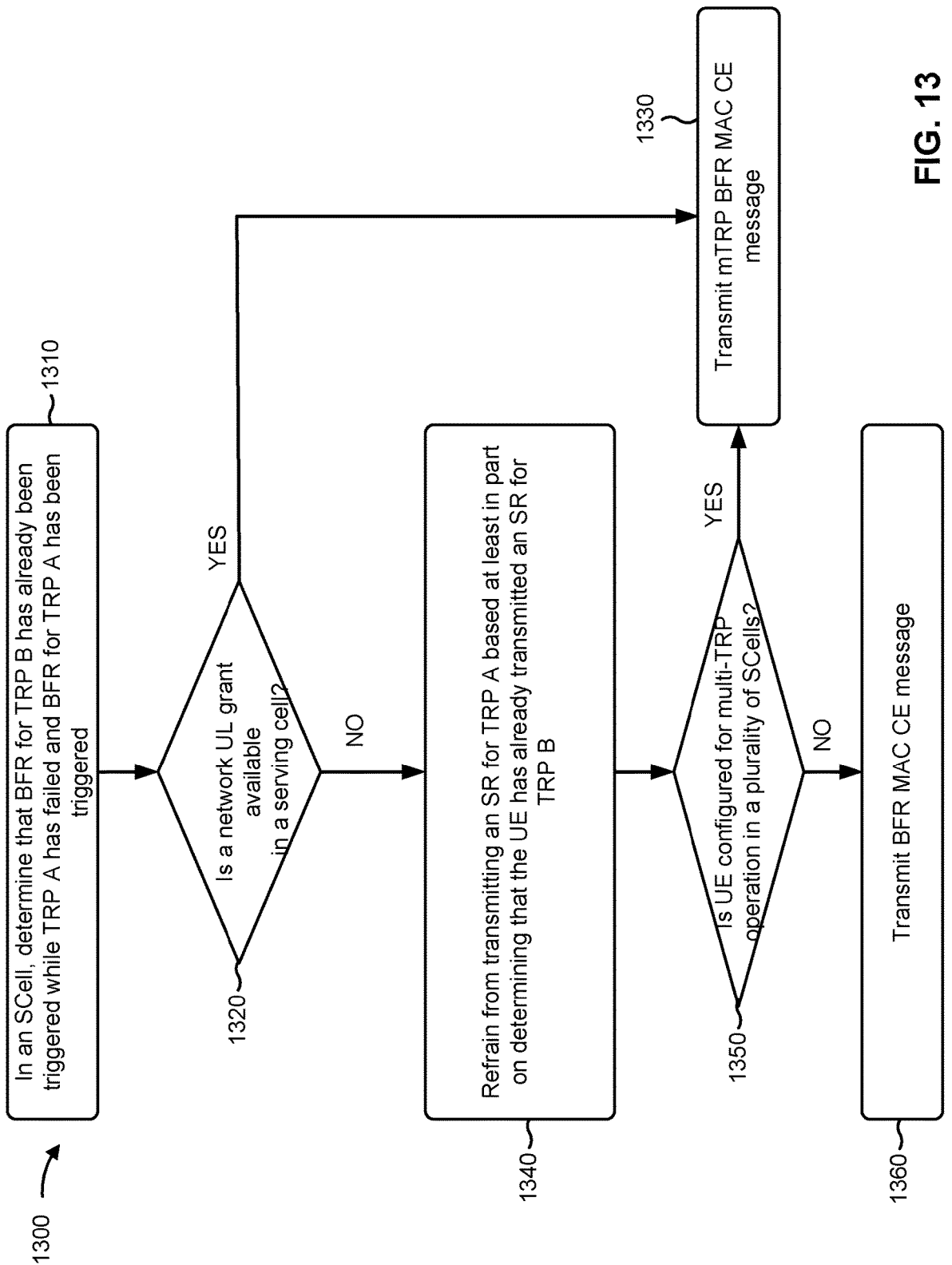

1300

1310 — In an SCell, determine that BFR for TRP B has already been triggered while TRP A has failed and BFR for TRP A has been triggered 1320 — Is a network UL grant available in a serving cell?

YES

NO

1340 — Refrain from transmitting an SR for TRP A based at least in part on determining that the UE has already transmitted an SR for TRP B 1350 — Is UE configured for multi-TRP operation in a plurality of SCells?

YES

NO

1330 — Transmit mTRP BFR MAC CE message

1360 — Transmit BFR MAC CE message

FIG. 13

1410 — Detect a beam failure associated with a first beam utilized to communicate with a first transmission-reception point (TRP) associated with a multi-TRP operation 1420 — Perform beam recovery, to address the beam failure, utilizing a network resource associated with a second TRP associated with the multi-TRP operation

1400

BEAM RECOVERY DURING MULTI-TRANSMISSION-RECEPTION POINT (TRP) OPERATION

CROSS-REFERENCE TO RELATED APPLICATION

This application is a 371 national stage of Patent Cooperation Treaty (PCT) Application No. PCT/CN2020/125116 filed on Oct. 30, 2020, entitled "BEAM RECOVERY DURING MULTI-TRANSMISSION-RECEPTION POINT (TRP OPERATION," which is hereby expressly incorporated by reference herein.

FIELD OF THE DISCLOSURE

Aspects of the present disclosure generally relate to wireless communication and to techniques and apparatuses for beam recovery during multi-transmission-reception point (TRP) operation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes detecting a beam failure associated with a first beam utilized to communicate with a first transmission-reception point (TRP) associated with a multi-TRP operation; and performing beam recovery, to address the beam failure, utilizing a network resource associated with a second TRP associated with the multi-TRP operation.

In some aspects, an apparatus for wireless communication includes means for detecting a beam failure associated with a first beam utilized to communicate with a first TRP associated with a multi-TRP operation; and means for performing beam recovery, to address the beam failure, utilizing a network resource associated with a second TRP associated with the multi-TRP operation.

In some aspects, a UE for wireless communication includes memory; one or more processors coupled to the memory; and instructions stored in the memory and operable, when executed by the one or more processors, to cause the UE to: detect a beam failure associated with a first beam utilized to communicate with a first TRP associated with a multi-TRP operation; and perform beam recovery, to address the beam failure, utilizing a network resource associated with a second TRP associated with the multi-TRP operation.

In some aspects, a non-transitory computer-readable medium stores one or more instructions for wireless communication that, when executed by one or more processors of a UE, cause the UE to: detect a beam failure associated with a first beam utilized to communicate with a first TRP associated with a multi-TRP operation; and perform beam recovery, to address the beam failure, utilizing a network resource associated with a second TRP associated with the multi-TRP operation.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 13 is a diagram illustrating an example associated with beam recovery during multi-TRP operation, in accordance with various aspects of the present disclosure.

DETAILED DESCRIPTION

Figure 1:
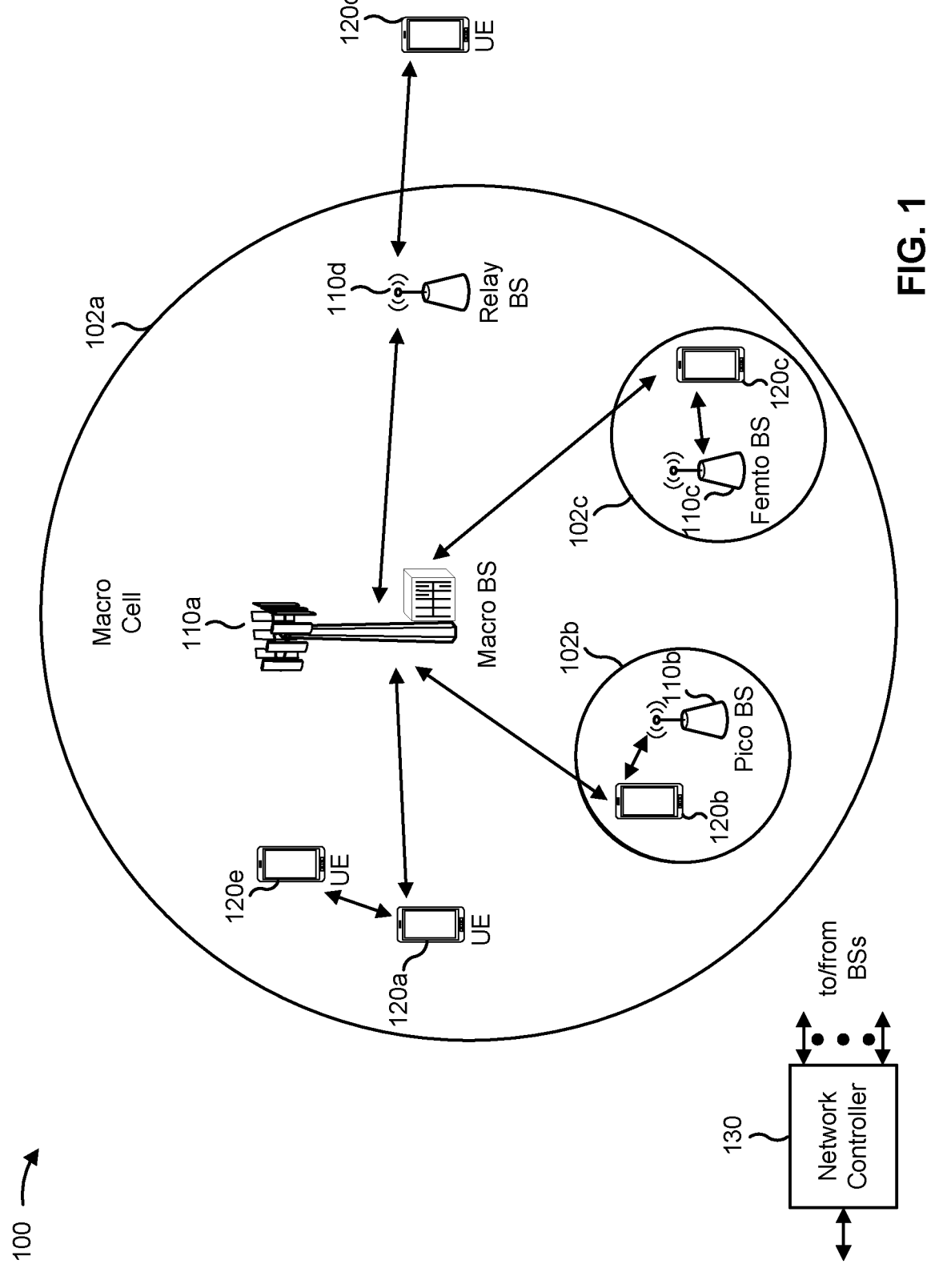
FIG. 1 is a diagram illustrating an example of a wireless network, in accordance with various aspects of the present disclosure.

A user equipment (UE) may conduct data communication with a base station (BS), which may include a plurality of transmission-reception points (TRPs) to conduct the data communication. Each transmission-reception point (TRP) may utilize a respective beam to transmit control information to the UE. The UE may be equipped to conduct beam failure detection (BFD) to detect a failure associated with receiving the control information. Because the BFD enables the UE to detect failures associated with receiving the control information from the BS, and not from a TRP, the BFD is unable to determine whether a first beam associated with a first TRP has failed and/or a second beam associated with a second TRP has failed. As a result, the UE is unable to perform a beam failure recovery (BFR) procedure to recover a failed beam, and, instead, performs the BFR procedure to recover each beam associated with the BS. Performing the BFR procedure to recover each beam may be inefficient because the UE may expend resources (e.g., processing power, utilization of memory space, power consumption, network resources, or the like) to recover a working beam (e.g., a beam over which control information may be adequately received). Additionally, the UE may be unable to utilize an uplink grant associated with the working beam to inform the BS of the failure associated with the failed beam.

Various aspects of techniques and apparatuses described herein may provide for beam recovery during multi-transmission-reception point (multi-TRP) operation, during which a UE may conduct data communication with a BS via a plurality of TRPs. In some aspects, the techniques and apparatuses described herein may enable the UE to independently detect and address a beam failure associated with a TRP, from among the plurality of TRPs in communication with the UE. For instance, when a given beam associated with a given TRP fails, the UE may perform independent BFD and/or BFR to recover the given beam. As a result, the UE may efficiently utilize internal resources (e.g., processing power, utilization of memory space, power consumption, or the like) and external resources (e.g., network resources, BS resources, or the like) while performing the BFD and/or BFR. The UE may also be enabled to utilize an uplink grant associated with another beam related to another TRP, from among the plurality of TRPs, to inform the BS of failure associated with the given beam. As a result, the UE may avoid a delay in performing BFR. In this way, the UE may be enabled to efficiently restore a connection with the BS.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. In some aspects, a BS may be associated with a plurality of TRPs communicating with a UE via respective downlink control channels. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
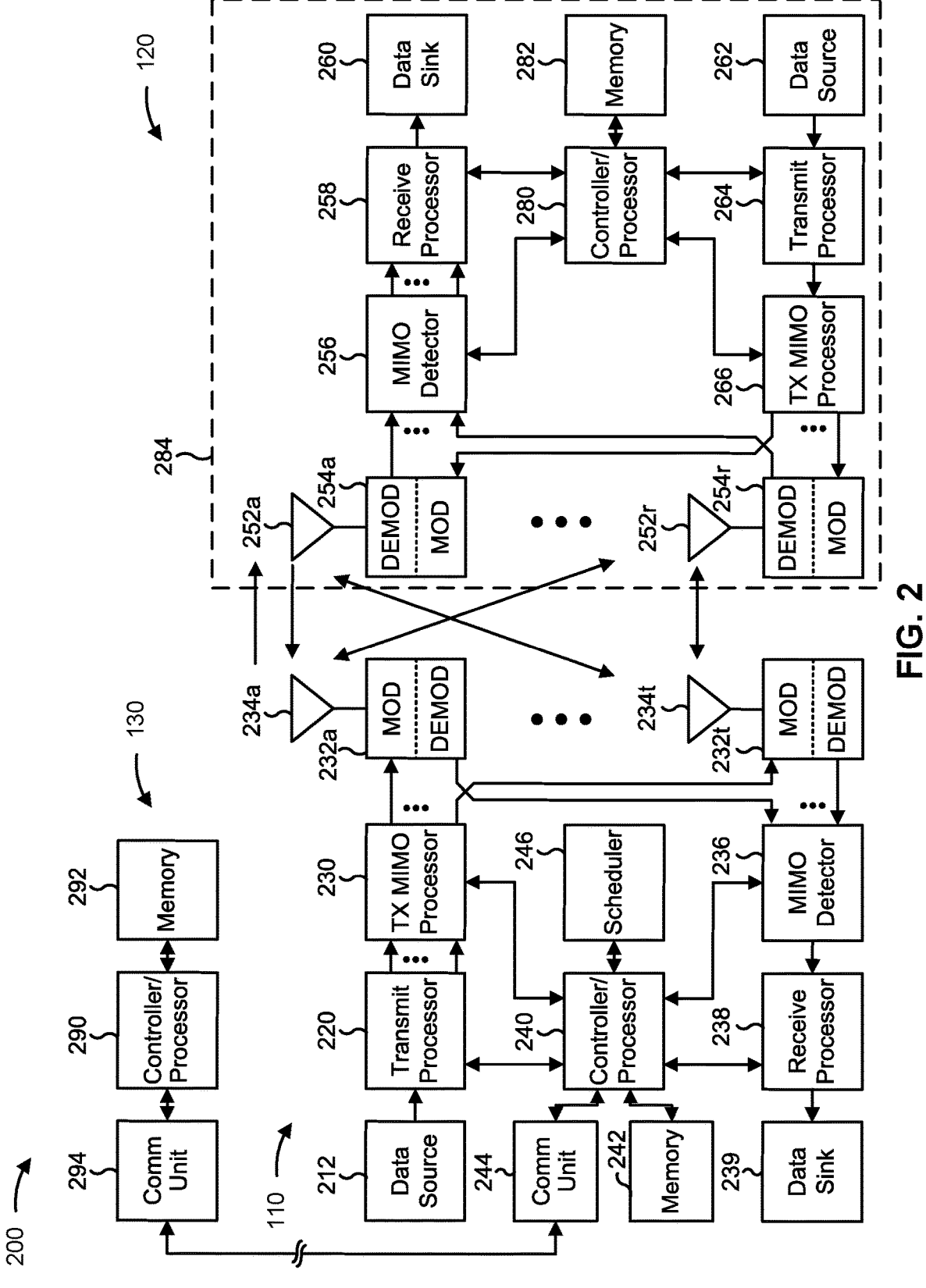
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T>1 and R>1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3-15.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3-15.

Controller/processor 240 of base station 110, controller/processor 280 of UE 120, and/or any other component(s) of FIG. 2 may perform one or more techniques associated with beam recovery during multi-TRP operation, as described in more detail elsewhere herein. For example, controller/processor 240 of base station 110, controller/processor 280 of UE 120, and/or any other component(s) of FIG. 2 may perform or direct operations of, for example, process 1400 of FIG. 14 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 1400 of FIG. 14, and/or other processes as described herein. In some aspects, executing instructions may include running the instructions, converting the instructions, compiling the instructions, interpreting the instructions, and/or the like.

In some aspects, UE 120 may include means for detecting a beam failure associated with a first beam utilized to communicate with a first transmission-reception point (TRP) associated with a multi-TRP operation, means for performing beam recovery, to address the beam failure, utilizing a network resource associated with a second TRP associated with the multi-TRP operation, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE and a BS may conduct data communication in a wireless network such as, for example, an LTE network and/or a 5G/NR network. The BS may include a plurality of antennas (or antenna panels), which may serve as a plurality of transmission-reception points (TRPs), to conduct the data communication with the UE. Each TRP may utilize a respective beam to transmit control information via a control channel (e.g., a physical downlink control channel (PDCCH)) to the UE. For instance, a first TRP may utilize a first beam to transmit control information via a first PDCCH to the UE and a second TRP may utilize a second beam to transmit control information via a second PDCCH to the UE. The control information may be associated with scheduling communication of data over a physical downlink shared channel (PDSCH) or a physical uplink shared channel (PUSCH).

To maintain a connection with the BS, the UE may be equipped to conduct beam failure detection (BFD) to detect a failure associated with received control information. For instance, the UE may detect a failure when the UE observes an error (e.g., packet error) associated with received control information and/or when a measure of a signal-to-interference-plus-noise ratio (SINR) associated with received control information fails to satisfy a threshold value (e.g., a measure of SINR is below the threshold value). Based on detecting one or more failures associated with received control information, the UE may determine that the first beam and/or the second beam has failed such that the connection with the BS is interrupted. The UE may perform a beam failure recovery (BFR) procedure to restore the connection with the BS.

Because the BFD enables the UE to detect failures associated with receiving the control information from the BS (e.g., from a serving cell provided by the BS), and not from a TRP, the BFD is unable to determine whether the first beam has failed and/or the second beam has failed. In other words, although the UE is aware that a beam has failed, the UE is unaware as to which beam (e.g., first beam and/or second beam) has failed. As a result, the UE is unable to perform the BFR procedure to recover the failed beam and, instead, performs the BFR procedure to recover each beam associated with the BS. Performing the BFR procedure to recover each beam (e.g., first beam and second beam) may be inefficient because the UE may expend resources to recover a working beam. For instance, the first beam associated with the first TRP may have failed while the second beam associated with the second TRP may be working such that the UE may adequately receive control information from the BS over the second beam. In this case, the UE may inefficiently expend internal resources (e.g., processing power, utilization of memory space, power consumption, or the like) and external resources (e.g., network resources, BS resources, or the like) to recover the working second beam.

Additionally, during the BFR procedure to recover each beam, the UE may be unable to utilize an uplink grant associated with the second beam to inform the BS of the failure associated with the first beam. Instead, the UE may have to rely on availability of a network uplink grant to enable the UE to inform the BS of the detected beam failure. As a result, a delay may be introduced in performing the BFR procedure. During the delay, the data communication between the UE and the BS may experience a stoppage.

Various aspects of techniques and apparatuses described herein may provide for beam recovery during multi-transmission-reception point (multi-TRP) operation, during which a UE may conduct data communication with a BS via a plurality of TRPs associated with the BS. In some aspects, the techniques and apparatuses described herein may enable the UE to independently detect and address a beam failure associated with a TRP, from among the plurality of TRPs. For instance, when a given beam associated with a given TRP fails, the UE may perform independent BFD and/or BFR to recover the given beam. As a result, the UE may be enabled to efficiently utilize internal resources (e.g., processing power, utilization of memory space, power consumption, or the like) and external resources (e.g., network resources, BS resources, or the like) while performing the BFR procedure. Based at least in part on the knowledge that a connection with another TRP is working (e.g., working TRP), the UE may be enabled to utilize an uplink grant associated with a working beam related to the working TRP to inform the BS of failure associated with the given beam. The UE may avoid relying on availability of a network uplink grant. As a result, the UE may avoid expending additional internal resources and/or avoid introducing a delay in performing the BFR procedure. In this way, the UE may be enabled to efficiently restore a connection with the BS and data communication between the UE and the BS may be improved.

In some aspects, the UE may detect a beam failure associated with a first beam utilized to communicate with a first TRP associated with a multi-TRP operation; and perform beam recovery, to address the beam failure, utilizing a network resource associated with a second TRP associated with the multi-TRP operation.

In some aspects, the BS conducting the data communication with the UE may be associated with a cell. The cell may be a primary cell or a secondary cell. The primary cell (PCell) may be a cell, operating at a primary frequency, in which the UE either performs an initial connection establishment procedure or initiates a connection re-establishment procedure. For example, the PCell may handle signaling, such as RRC signaling, associated with the UE. In some aspects, the primary cell may be a cell indicated as the primary cell during a handover procedure. The primary cell may also be referred to as a special cell (SpCell). The secondary cell (SCell) may be a cell, operating at a second frequency, which may be configured to provide additional radio resources to the UE. In some aspects, a serving cell may refer to a set of one or more cells including the primary cell and one or more secondary cells. For example, the primary cell and the one or more secondary cells may each be considered serving cells. In some aspects, the UE may be associated with a master cell group including a main BS and enabling dual connectivity for the UE such that the UE may communicate with a plurality of cells including the primary cell and one or more secondary cells. In some aspects, the UE may be associated with a secondary cell group including a secondary BS and enabling dual connectivity for the UE such that the UE may communicate with a plurality of cells including the primary cell and one or more secondary cells. In some aspects, a secondary cell may also handle signaling, and may be referred to as a primary secondary cell (PSCell). A PSCell may be considered an SpCell.

Figure 3:
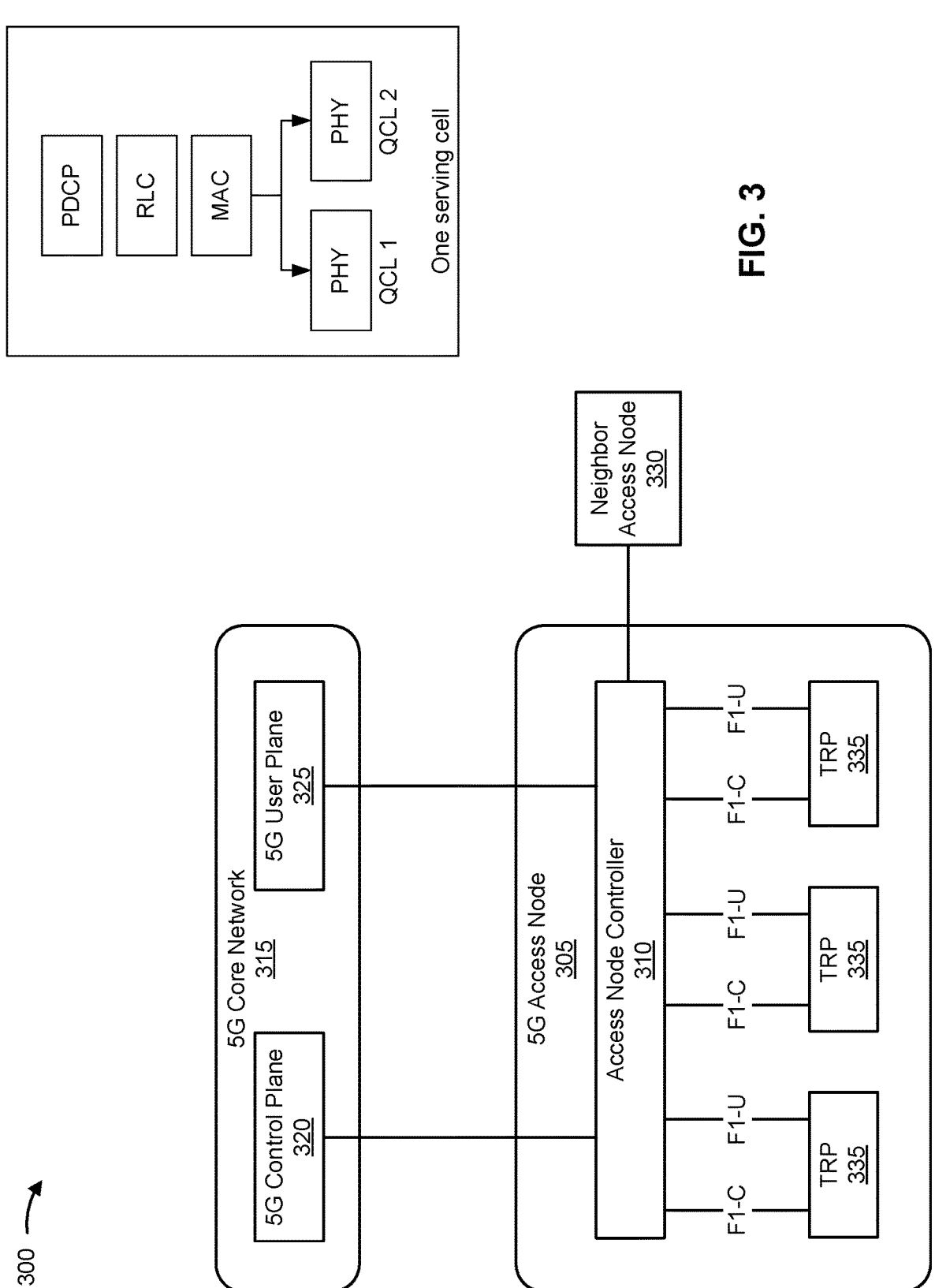
FIG. 3 is a diagram illustrating an example associated with beam recovery during multi-TRP operation, in accordance with various aspects of the present disclosure.

FIG. 3 illustrates an example 300 of a logical architecture of a distributed RAN associated with beam recovery during multi-TRP operation, in accordance with various aspects of the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330

(e.g., another 5G access node 305, an LTE access node, and/or the like) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may be associated with a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some aspects, the TRPs 335 associated with the base station 110 may be included in a serving cell associated with a UE 120. In some cases, a TRP 335 may be referred to as a cell, a panel, an antenna array, an array, and/or the like.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, a medium access control (MAC) layer, and/or the like may be configured to terminate at the access node controller 310 or at a TRP 335. In some aspects, functions associated with the PDCP layer, the RLC layer, and/or the MAC layer may be controlled and/or performed by the base station 110, and functions associated with a physical layer (PHY) may be controlled and/or performed by the TRPs 335.

In some aspects, multiple TRPs 335 may transmit communications (e.g., the same communication or different communications) in the same transmission time interval (TTI) (e.g., a slot, a mini-slot, a subframe, a symbol, and/or the like) or different TTIs using different QCL relationships (e.g., different spatial parameters, different transmission configuration indicator (TCI) states, different precoding parameters, different beamforming parameters, and/or the like). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

As indicated above, FIG. 3 is provided as an example. Other examples may differ from what was described with regard to FIG. 3.

Figure 4:
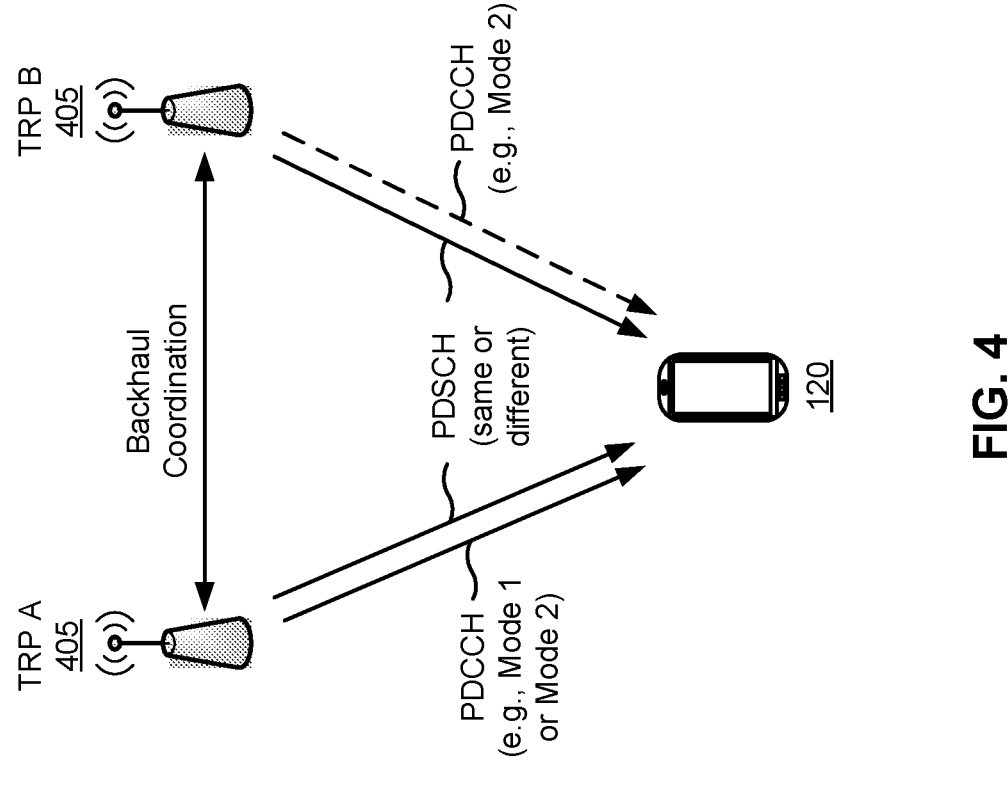
FIG. 4 is a diagram illustrating an example associated with beam recovery during multi-TRP operation, in accordance with various aspects of the present disclosure.

FIG. 4 is a diagram illustrating an example 400 multi-TRP communication (sometimes referred to as multi-panel communication) associated with beam recovery during multi-TRP operation, in accordance with various aspects of the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions and/or the like) to improve reliability, increase throughput, and/or the like. The TRPs 405 may coordinate such communications via an interface between the TRPs 405 (e.g., a backhaul interface, an access node controller 310, and/or the like). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, different layers (e.g., of a multi-layer communication), and/or the like.

In a first multi-TRP transmission mode (e.g., Mode 1), a beam associated with a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship (QCL1 shown in FIG. 3) or a first TCI state for a first set of DMRS ports corresponding to a first set of layers, and a second TRP 405 may use a second (different) QCL relationship (QCL2 shown in FIG. 3) or a second (different) TCI state for a second (different) set of DMRS ports corresponding to a second (different) set of layers. In some aspects, a TCI state in downlink control information (DCI) (e.g., transmitted on the PDCCH, such as DCI format 1_0, DCI format 1_1, and/or the like) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as discussed here) in this multi-TRP transmission mode (e.g., Mode 1).

In a second multi-TRP transmission mode (e.g., Mode 2), multiple respective beams associated with multiple PDCCHs may be used to schedule downlink data communications for multiple corresponding PDSCHs (e.g., one PDCCH for each PDSCH). In this case, a first beam associated with a first PDCCH may be utilized to schedule a first codeword to be transmitted by a first TRP 405, and a second beam associated with a second PDCCH may be utilized to schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0, DCI format 1_1, and/or the like) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

As indicated above, FIG. 4 is provided as an example. Other examples may differ from what is described with respect to FIG. 4.

Figure 5:
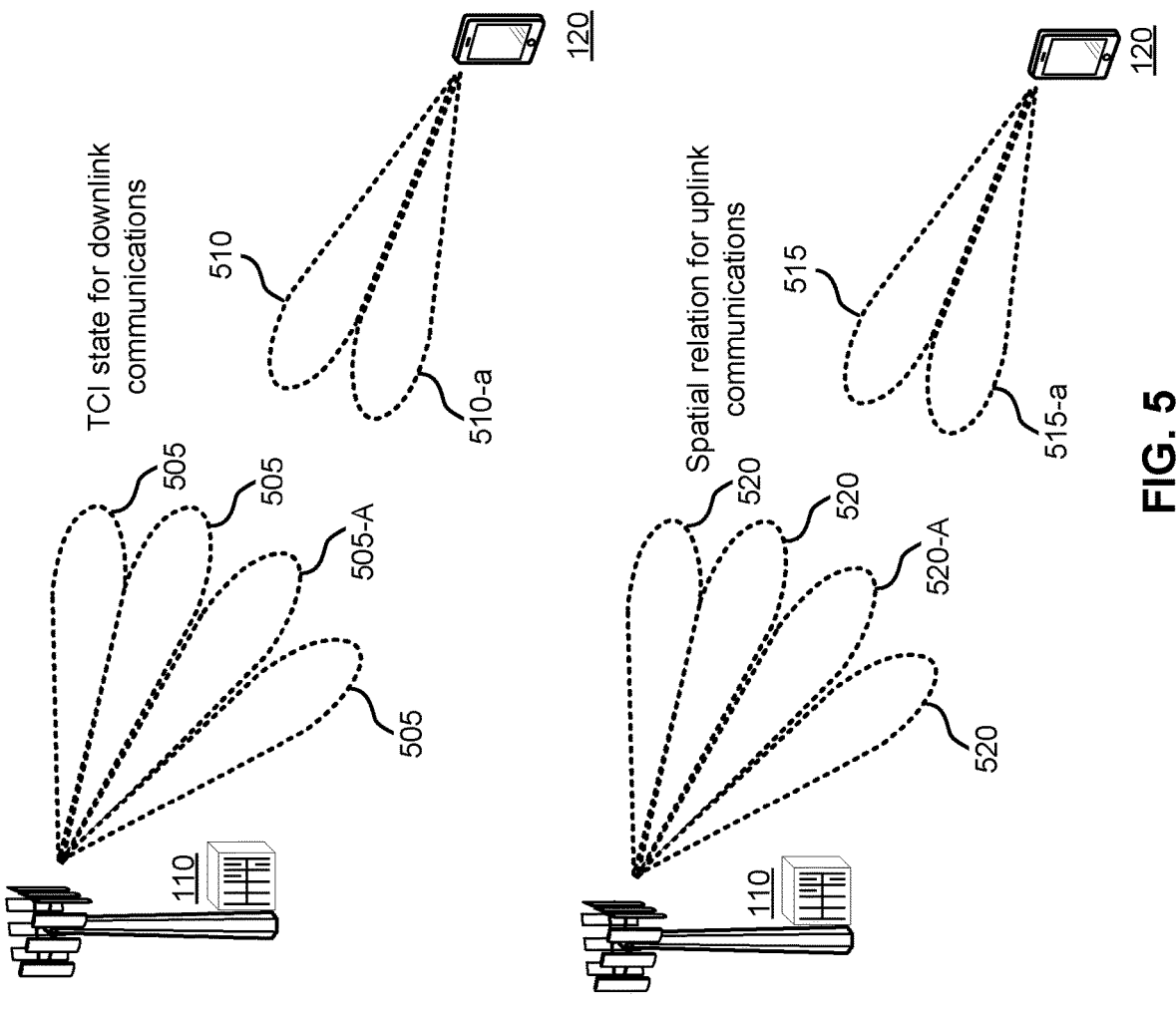
FIG. 5 is a diagram illustrating an example associated with beam recovery during multi-TRP operation, in accordance with various aspects of the present disclosure.

FIG. 5 is a diagram illustrating an example 500 of using beams for communications between a base station and a UE, associated with beam recovery during multi-TRP operation, in accordance with various aspects of the present disclosure. As shown in FIG. 5, a base station 110 and a UE 120 may communicate with one another.

The base station 110 may utilize multiple TRPs to transmit to UEs 120 located within a coverage area of the base station 110. The multiple TRPs associated with the base station 110 and the UE 120 may be configured for beamformed communications, where the multiple TRPs associated with the base station 110 may transmit in the direction of the UE 120 using one or more directional BS transmit beams, and the UE 120 may receive the transmission using one or more directional UE receive beams. Each BS transmit beam may have an associated beam ID, beam direction, or beam symbols, among other examples. The base station 110 may transmit downlink communications via one or more BS transmit beams 505.

The UE 120 may attempt to receive downlink transmissions via one or more UE receive beams 510, which may be configured using different beamforming parameters at receive circuitry of the UE 120. The UE 120 may identify a particular BS transmit beam 505, shown as BS transmit beam 505-A, and a particular UE receive beam 510, shown as UE receive beam 510-A, that provide relatively favorable performance (for example, that have a best channel quality of the different measured combinations of BS transmit beams 505 and UE receive beams 510). In some examples, the UE 120 may transmit an indication of which BS transmit beam 505 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 505-A and the UE receive beam 510-A), which may be further refined and maintained in accordance with one or more established beam refinement procedures.

A downlink beam, such as a BS transmit beam 505 or a UE receive beam 510, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 505 may be associated with a synchronization signal block (SSB), and the UE 120 may indicate a preferred BS transmit beam 505 by transmitting uplink transmissions in resources of the SSB that are associated with the preferred BS transmit beam 505. A particular SSB may have an associated TCI state (for example, for an antenna port or for beamforming). The base station 110 may, in some examples, indicate a downlink BS transmit beam 505 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 510 at the UE 120. Thus, the UE 120 may select a corresponding UE receive beam 510 from a set of BPLs based at least in part on the base station 110 indicating a BS transmit beam 505 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 and/or the multiple TRPs may use for downlink transmission on a physical downlink shared channel (PDSCH). The set of activated TCI states for downlink control channel communications may correspond to beams that the base station 110 and/or the multiple TRPs may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 and/or the multiple TRPs using one or more directional UE transmit beams, and the base station 110 and/or the multiple TRPs may receive the transmission using one or more directional BS receive beams. Each UE transmit beam may have an associated beam ID, beam direction, or beam symbols, among other examples. The UE 120 may transmit uplink communications via one or more UE transmit beams 515.

The base station 110 and/or the multiple TRPs may receive uplink transmissions via one or more BS receive beams 520. The base station 110 and/or the multiple TRPs may identify a particular UE transmit beam 515, shown as UE transmit beam 515-A, and a particular BS receive beam 520, shown as BS receive beam 520-A, that provide relatively favorable performance (for example, that have a best channel quality of the different measured combinations of UE transmit beams 515 and BS receive beams 520). In some examples, the base station 110 and/or the multiple TRPs may transmit an indication of which UE transmit beam 515 is identified by the base station 110 and/or the multiple TRPs as a preferred UE transmit beam, which the base station 110 and/or the multiple TRPs may select for transmissions from the UE 120. The UE 120 and the base station 110 (and/or the multiple TRPs) may thus attain and maintain a BPL for uplink communications (for example, a combination of the UE transmit beam 515-A and the BS receive beam 520-A), which may be further refined and maintained in accordance with one or more established beam refinement procedures. An uplink beam, such as a UE transmit beam 515 or a BS receive beam 520, may be associated with a spatial relation. A spatial relation may indicate a directionality or a characteristic of the uplink beam, similar to one or more QCL properties, as described above.

As indicated above, FIG. 5 is provided as an example. Other examples may differ from what is described with respect to FIG. 5.

Figure 6:
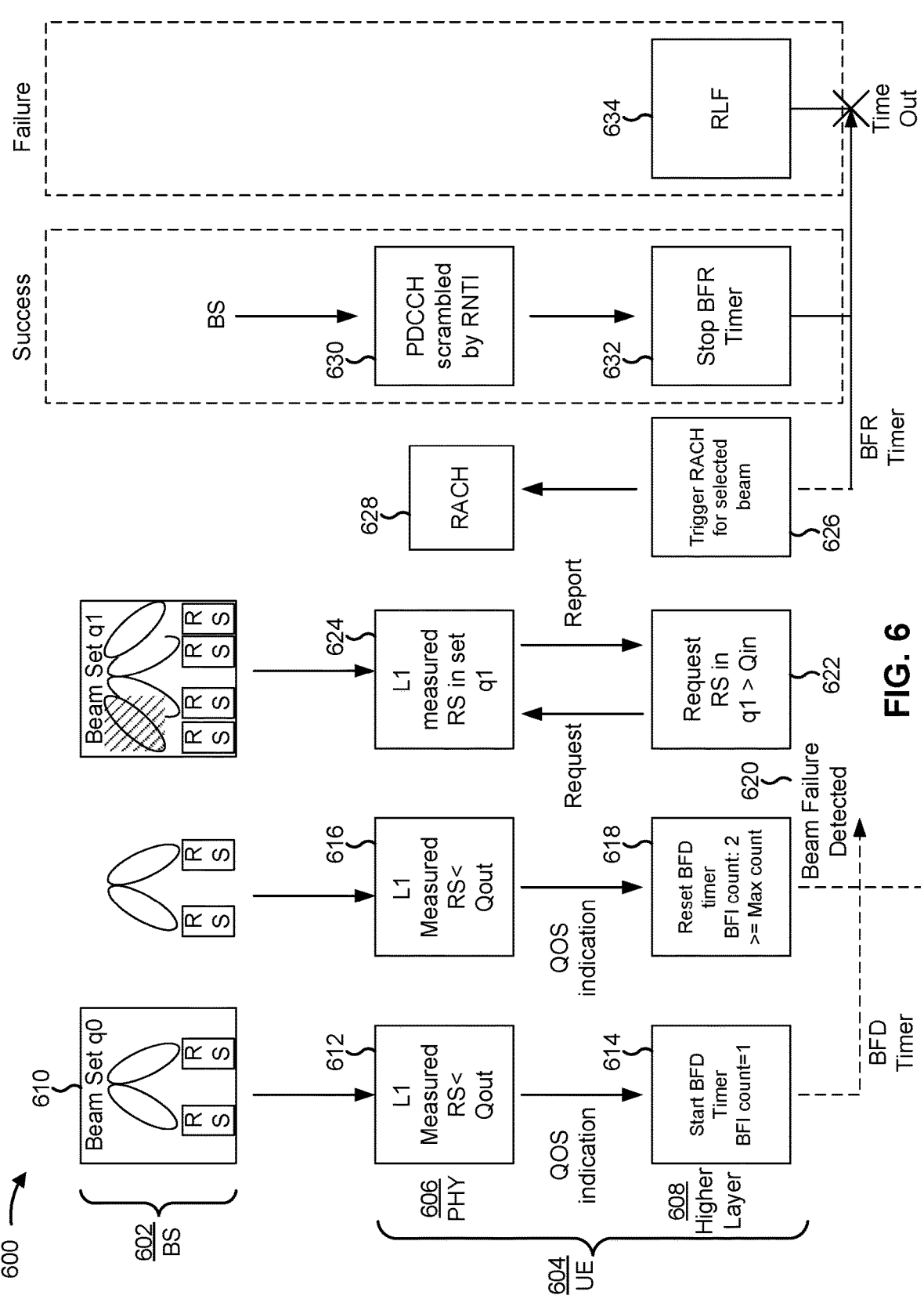
FIG. 6 is a diagram illustrating an example associated with beam recovery during multi-TRP operation, in accordance with various aspects of the present disclosure.

FIG. 6 is a diagram illustrating an example 600 of beam failure detection (BFD) and beam failure recovery (BFR) during multi-TRP operation, in accordance with various aspects of the present disclosure. The beam failure detection and beam failure recovery procedures described with respect to FIG. 6 may be performed for a half duplex link (e.g., downlink only) or a full duplex link (e.g., downlink and uplink). In the case of a half duplex link, the procedures described with respect to FIG. 6 may be performed based at least in part on a half duplex failure detection CORESET. In the case of a full duplex link, the procedures described with respect to FIG. 6 may be performed based at least in part on a full duplex failure detection CORESET. The full duplex failure detection CORESET is described in more detail in connection with FIGS. 4A and 4B. The beam failure detection (BFD) procedure is shown by reference numbers 612 through 620, and the beam failure recovery (BFR) procedure is shown by reference number 622 through 634.

Example 600 includes operations performed by a base station (e.g., BS 110) and operations performed by a UE (e.g., UE 120). Operations performed by the base station are shown in the top part of FIG. 6, as shown by reference number 602. Operations performed by the UE are shown in the bottom part of FIG. 6, as shown by reference number 604. Each operation is indicated by a box, and arrows indicate a direction of an indication, a transmission, and/or the like. Actions of the UE that are performed by a physical (PHY) layer of the UE are shown in the row indicated by reference number 606, and actions of the UE that are performed by a higher layer (e.g., media access control (MAC), radio link control (RLC), packet data convergence protocol (PDCP), radio resource control (RRC), non access stratum (NAS), Internet Protocol (IP), and/or the like) are shown in the row indicated by reference number 608.

As shown by reference number 610, the base station may transmit, via multiple TRPs, a beam set q0. The beam set q0 may include one or more beams that are each associated with a corresponding reference signal (RS). The reference signal may include a synchronization signal block (SSB), a channel state information (CSI) RS (CSI-RS), and/or the like. In some aspects, the base station may transmit the beam set q0 based at least in part on a failure detection CORESET, such as a half-duplex failure detection CORESET or a full duplex failure detection CORESET. For example, the base station may select the beams of the beam set q0 and/or control channels on which the respective reference signals of the beams are to be transmitted, based at least in part on the failure detection CORESET.

As shown by reference number 612, the UE may perform a Layer 1 (L1) measurement of the reference signals of the beam set q0. For example, the UE may determine a measurement regarding each reference signal of the beam set q0. The measurement may include a reference signal received power, a reference signal received quality, a signal to interference and noise ratio, and/or the like. As further shown, the UE (e.g., the PHY layer) may determine that the L1 measurement fails to satisfy a first threshold, referred to as Qout. Qout may be defined based at least in part on the level at which the downlink radio link cannot be reliably received, indicating that the UE is out of sync with the base station. In some aspects, Qout may be based at least in part on an out-of-sync block error rate ($BLER_{out}$). In some aspects, Qout may be based at least in part on an uplink channel parameter of the UE, as described in more detail elsewhere herein. As shown, the UE (e.g., the physical layer) may provide a quality of service (QOS) indication to a higher layer of the UE.

As shown by reference number 614, the UE (e.g., the higher layer) may start a beam failure detection (BFD) timer based at least in part on the failure of the beams to satisfy Qout and may increment a beam failure indication (BFI) count. If the BFI count satisfies a threshold (shown as max count in connection with reference number 618) before the expiration of the BFD timer, then the UE may determine beam failure. If the BFD timer expires before the BFI count satisfies the threshold, then the UE may reset the BFI count, thereby not determining a beam failure.

As shown by reference number 616, the UE (e.g., the PHY layer) may perform a second L1 measurement of the reference signals of the beam set q0. As further shown, the UE may provide a QOS indication to the higher layer of the UE indicating that the second L1 measurement fails to satisfy Qout. If the second L1 measurement had satisfied Qout, then the BFD timer may expire and the UE may not identify beam failure.

As shown by reference number 618, the UE may reset the BFD timer based at least in part on the second L1 measurement failing to satisfy the threshold and may increment the BFI count. As further shown, the BFI count now satisfies the maximum count threshold. Accordingly, as shown by reference number 620, the UE determines that beam failure is detected.

As shown by reference number 622, the UE (e.g., the higher layer) may request measurement of reference signals on a beam set q1 to identify one or more beams of the beam set q1 that satisfy a second threshold (e.g., Qin). For example, the beam set q1 may be a set of candidate beams for the beam failure recovery procedure. Qin may be defined based at least in part on a level at which the downlink radio quality can be significantly more reliably received than at Qout. In some aspects, Qin may be based at least in part on an in-sync block error rate ($BLER_{in}$). In some aspects, Qin may be based at least in part on an uplink transmission parameter, as described in more detail elsewhere herein.

As shown by reference number 624, the UE 120 (e.g., the PHY layer) may provide measurement information identifying L1 measurements of reference signals of the beam set q1. Assume that the measurement information indicates that a particular reference signal associated with a particular beam satisfies Qin. In FIG. 6, the particular beam is illustrated by diagonal hatching. In that case, the UE 120 may select the particular beam as a selected beam and may attempt to access the selected beam (sometimes referred to as "RACH-ing onto" the selected beam). For example, as shown by reference number 626, the UE (e.g., the higher layer) may trigger a random access channel (RACH) procedure to access the selected beam, and, as shown by reference number 628, the UE (e.g., the PHY layer) may perform the RACH procedure. For example, the UE may provide a RACH Message 1 to the base station to access the selected beam.

In the case wherein the RACH procedure is successful, the BS may provide a physical downlink control channel (PDCCH) on the selected beam, as shown by reference number 630. In some aspects, this response may be a response to the RACH Message 1, such as a RACH Message 2, and/or the like. As further shown, the PDCCH may be scrambled using a radio network temporary identifier (RNTI) (e.g., a cell-specific RNTI or another type of RNTI). As shown by reference number 632, the UE may stop the BFR timer based at least in part on the beam failure recovery being successful.

In the case wherein the RACH procedure is unsuccessful, the UE may determine radio link failure (RLF) after expiration of the BFR timer, as shown by reference number 634. In such a case, the UE may enter an idle mode, may report the radio link failure, may search for a new cell, and/or the like.

As indicated above, FIG. 6 is provided as an example. Other examples may differ from what was described with respect to FIG. 6.

Figure 7:
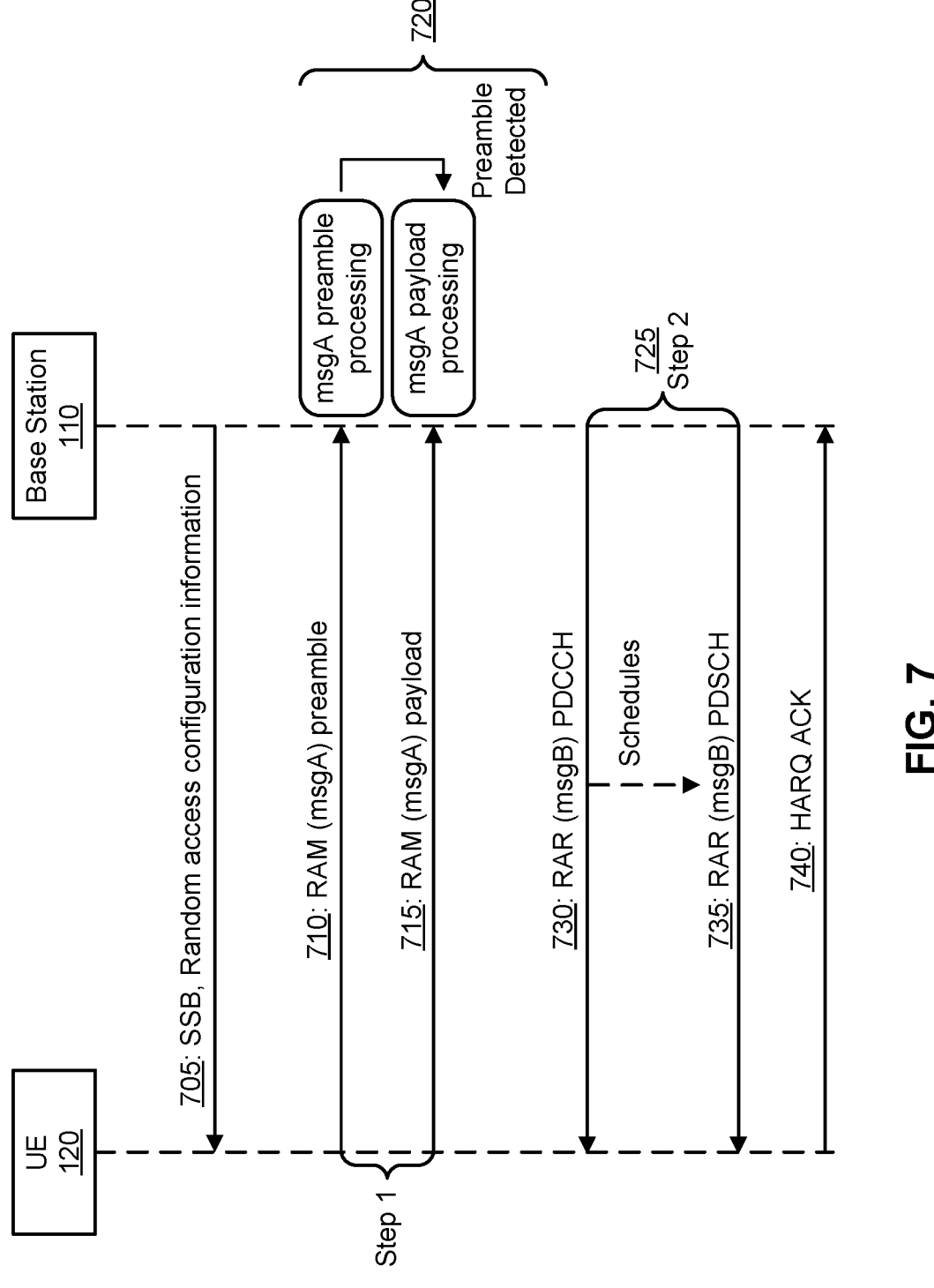
FIG. 7 is a diagram illustrating an example associated with beam recovery during multi-TRP operation, in accordance with various aspects of the present disclosure.

FIG. 7 is a diagram illustrating an example 700 of a random access (RACH) procedure associated with beam recovery during multi-TRP operation, in accordance with various aspects of the present disclosure. As discussed below, a base station 110 and a UE 120 may communicate with one another to perform a two-step random access procedure and/or a four-step random access procedure. In other words, both the two-step random access procedure and the four-step random access procedure are applicable to the present disclosure.

As shown by reference number 705, the base station 110 may transmit, and the UE 120 may receive, one or more synchronization signal blocks (SSBs) and random access configuration information. In some aspects, the random access configuration information may be transmitted in and/or indicated by system information (e.g., in one or more system information blocks (SIBs) and/or the like) and/or an SSB, such as for contention-based random access. Additionally, or alternatively, the random access configuration information may be transmitted in a radio resource control (RRC) message and/or a physical downlink control channel (PDCCH) order message that triggers a RACH procedure, such as for contention-free random access. The random access configuration information may include one or more parameters to be used in the two-step random access procedure, such as one or more parameters for transmitting a random access message (RAM), receiving a random access response (RAR) to the RAM, and/or the like.

As shown by reference number 710, the UE 120 may transmit, and the base station 110 may receive, a RAM preamble. As shown by reference number 715, the UE 120 may transmit, and the base station 110 may receive, a RAM payload. As shown, the UE 120 may transmit the RAM preamble and the RAM payload to the base station 110 as part of an initial (or first) step of the two-step random access procedure. In some aspects, the RAM may be referred to as message A, msgA, a first message, an initial message, and/or the like in a two-step random access procedure. Furthermore, in some aspects, the RAM preamble may be referred to as a message A preamble, a msgA preamble, a preamble, a physical random access channel (PRACH) preamble, and/or the like, and the RAM payload may be referred to as a message A payload, a msgA payload, a payload, and/or the like. In some aspects, the RAM may include some or all of the contents of message 1 (msg1) and message 3 (msg3) of the four-step random access procedure, which is described in more detail below. For example, the RAM preamble may include some or all contents of message 1 (e.g., a PRACH preamble), and the RAM payload may include some or all contents of message 3 (e.g., a UE identifier, uplink control information (UCI), a physical uplink shared channel (PUSCH) transmission, and/or the like).

As shown by reference number 720, the base station 110 may receive the RAM preamble transmitted by the UE 120. If the base station 110 successfully receives and decodes the RAM preamble, the base station 110 may then receive and decode the RAM payload.

As shown by reference number 725, the base station 110 may transmit an RAR (sometimes referred to as an RAR message). As shown, the base station 110 may transmit the RAR message as part of a second step of the two-step random access procedure. In some aspects, the RAR message may be referred to as message B, msgB, or a second message in a two-step random access procedure. The RAR message may include some or all of the contents of message 2 (msg2) and message 4 (msg4) of a four-step random access procedure. For example, the RAR message may include the detected PRACH preamble identifier, the detected UE identifier, a timing advance value, contention resolution information, and/or the like.

As shown by reference number 730, as part of the second step of the two-step random access procedure, the base station 110 may transmit a physical downlink control channel (PDCCH) communication for the RAR. The PDCCH communication may schedule a physical downlink shared channel (PDSCH) communication that includes the RAR. For example, the PDCCH communication may indicate a resource allocation (e.g., in downlink control information (DCI)) for the PDSCH communication.

As shown by reference number 735, as part of the second step of the two-step random access procedure, the base station 110 may transmit the PDSCH communication for the RAR, as scheduled by the PDCCH communication. The RAR may be included in a medium access control (MAC) protocol data unit (PDU) of the PDSCH communication. As shown by reference number 740, if the UE 120 successfully receives the RAR, the UE 120 may transmit a hybrid automatic repeat request (HARQ) acknowledgement (ACK).

As indicated above, FIG. 7 is provided as an example. Other examples may differ from what is described with regard to FIG. 7.

Figure 8:
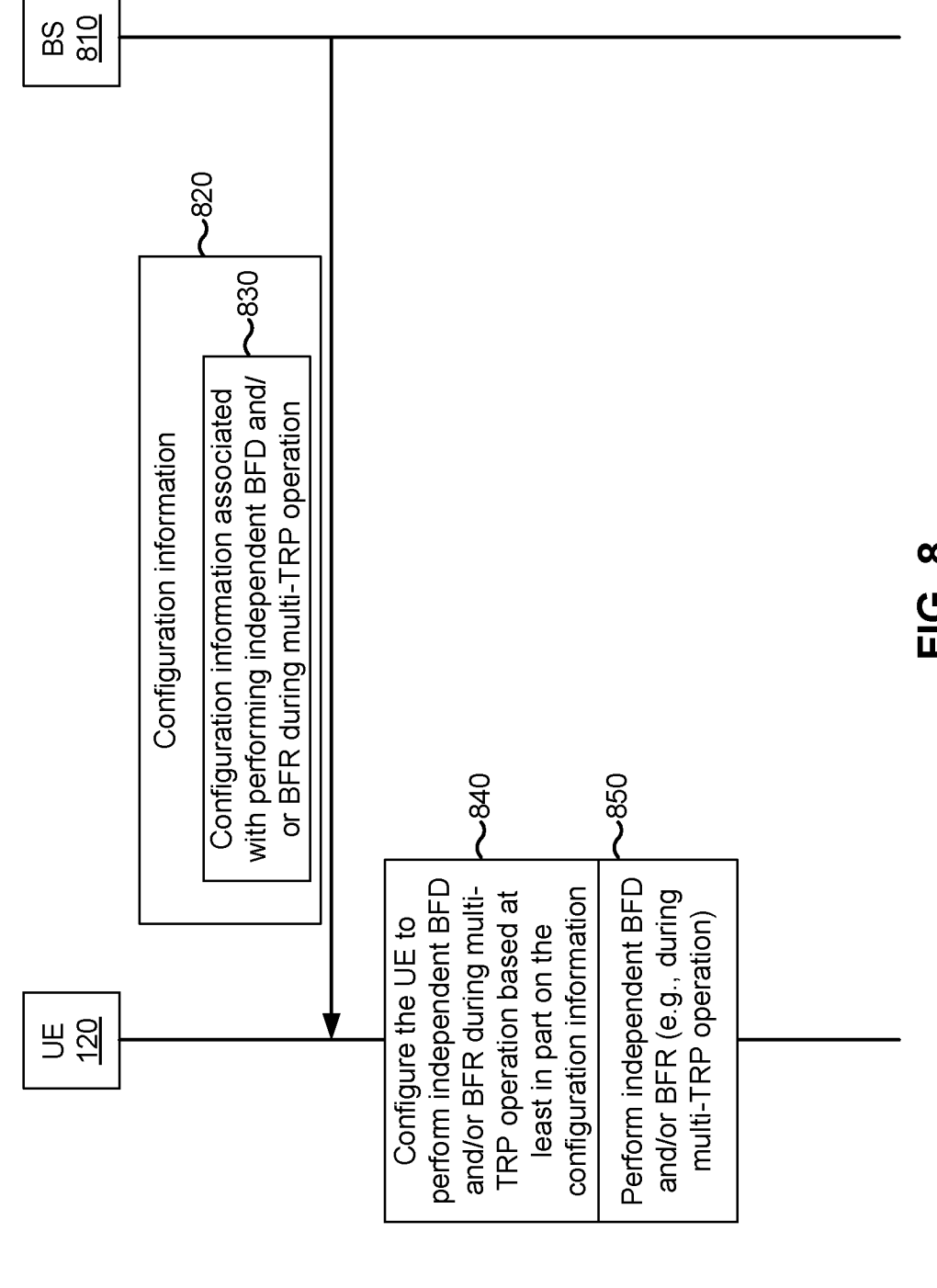
FIG. 8 is a diagram illustrating an example associated with beam recovery during multi-TRP operation, in accordance with various aspects of the present disclosure.

FIGS. 8-13 are diagrams illustrating examples 800, 900, 1000, 1100, 1200, and 1300, respectively, associated with beam recovery during multi-TRP operation, in accordance with various aspects of the present disclosure. FIG. 8 shows a UE 120 and a BS 810 conducting data communication in, for example, an LTE network or a 5G/NR network. The data communication may include downlink communications from the BS 810 to the UE 120 and may include uplink communications from the UE 120 to the BS 810. The BS 810 may be associated with multiple transmission-reception points (TRPs), which may conduct the data communication with the UE 120. In some aspects, the multiple TRPs may conduct the data communication by utilizing respective beams associated with multiple PDCCHs to schedule downlink data communications to the UE 120.

As shown by reference number 820, the BS 810 may transmit, and the UE 120 may receive, configuration information at a beginning of and/or during the data communication. In some aspects, the UE 120 may receive the configuration information from a device other than BS 810 (e.g., from another base station). In some aspects, the UE 120 may receive the configuration information via, for example, a control channel (e.g., a PDCCH) established between the UE 120 and the BS 810. The configuration information may be communicated via radio resource control (RRC) signaling, medium access control (MAC) signaling, downlink control information (DCI), or a combination thereof (e.g., RRC configuration of a set of values for a parameter and DCI indication of a selected value of the parameter).

In some aspects, the configuration information may include an indication of, for example, one or more configuration parameters for the UE 120 to use to configure the UE 120 for the data communication. For instance, as shown by reference number 830, the configuration information may include information associated with configuring the UE 120 to perform beam failure detection (BFD) and/or to perform beam failure recovery (BFR) during multi-TRP operation. As shown by reference number 840, based at least in part on the configuration information, the UE 120 may configure the UE 120 to perform BFD and/or to perform BFR.

In some aspects, the configuration information may include one or more BFD parameters associated with one or more of the multiple TRPs. The one or more BFD parameters may include a beam failure instance (BFI) counter, a BFI max count, and/or a BFD timer (discussed with respect to FIG. 6). Based at least in part on the one or more BFD parameters, the UE 120 may configure the UE 120 to detect beam failures related to the respective beams utilized by the multiple TRPs. In some aspects, the UE 120 may perform BFD independently for each TRP, which may enable the UE 120 to detect a beam failure associated with a given beam related to a given TRP and/or to perform BFR to recover the given beam. For instance, the UE 120 may detect a BFI for TRP A (discussed with respect to FIG. 4). In some aspects, the UE 120 may detect the BFI when the UE 120 observes an error (e.g., packet error) associated with receiving a downlink communication via a beam A utilized by TRP A. Additionally, or alternatively, the UE 120 may detect the BFI when the UE 120 determines that a measure of a signal-to-interference-plus-noise ratio (SINR) associated with receiving the downlink communication via beam A fails to satisfy a threshold value (e.g., the measure of SINR is below the threshold value).

Based at least in part on detecting a BFI, the UE 120 may increment the BFI counter associated with beam A and/or TRP A (collectively referred to as TRP A) and start the BFD timer associated with TRP A. When a value associated with the BFI counter satisfies the BFI max count (e.g., the value associated with the BFI counter is equal to or greater than the BFI max count) associated with TRP A, the UE 120 may determine that beam A has failed. Based at least in part in determining that beam A has failed, the UE 120 may perform a BFR procedure to address the beam failure (e.g., recover beam A or another beam) to restore a connection with TRP A. In some aspects, the UE 120 may reset the BFD timer associated with TRP A when the BFD timer associated with TRP A expires prior to the BFI counter satisfying the BFI max count. In this case, the UE 120 may determine that beam A is working and has not failed. In some aspects, the UE 120 may reset the BFD timer when the BS 110 reconfigures one or more BFD parameters associated with TRP A prior to the BFI counter satisfying the BFI max count. In this case, the UE 120 may determine that beam A is working and has not failed.

In some aspects, the configuration information may include information associated with configuring respective BFD reference signal (RS) resources for one or more of the multiple TRPs. The configuration of the respective BFD RS resources may be explicit and/or may be implicit. For instance, the configuration information may explicitly configure one or more of the multiple TRPs with respective detection resources, and may associate the respective detection resources with respective CORESET pool indices associated with the one or more of the multiple TRPs. In one example, the configuration information may explicitly configure TRP B with a detection resource B, and may associate the detection resource B with a CORESET pool index B associated with TRP B. In some aspects, the configuration information may enable the UE 120 to configure the UE 120 to perform BFD, for TRP B, based at least in part on associating the detection resource B with the CORESET pool index B. In some aspects, the configuration information may implicitly configure quasi co-location of indices with respective reference signals associated with the one or more of the multiple TRPs. In one example, the configuration information may implicitly quasi co-locate an index A with a reference signal A associated with TRP A, and enable the UE 120 to configure the UE 120 to perform BFD associated with TRP A based at least in part on quasi co-locating the index A with the reference signal A.

In some aspects, the configuration information may include information associated with configuring one or more of the multiple TRPs with a respective plurality of recovery candidate beams. In some aspects, the configuration information may associate the respective plurality of recovery candidate beams with respective CORESET pool indices of the one or more of the multiple TRPs. For instance, the configuration information may configure TRP A with a respective plurality of recovery candidate beams, which may be associated with a CORESET pool index A associated with TRP A. Based at least in part on such association, the UE 120 may configure the UE 120 to perform BFD associated with TRP A. Based at least in part on determining that beam A associated with TRP A has failed, the UE 120 may configure UE 120 to perform BFR to address the beam failure associated with TRP A. During performance of such BFR, the UE 120 may identify one or more candidate beams, from among the respective plurality of recovery candidate beams configured for TRP A, to utilize to communicate with TRP A.

The UE 120 may configure the UE 120 to transmit information associated with the UE 120 performing BFD and/or BFR. In some aspects, the UE 120 may utilize an uplink grant associated with a working TRP (e.g., TRP B) to transmit information associated with the identified one or more candidate beams to the BS 810. Based at least in part on transmitting information associated with the UE 120 performing BFD and/or BFR, the UE 120 may configure the UE 120 to receive, from the BS 810, information associated with reconfiguring resources to address the beam failure. For instance, based at least in part on transmitting information associated with the identified one or more candidate beams, the UE 120 may receive information about a given candidate beam configured to be utilized by the UE 120 to communicate with TRP A. In some aspects, the UE 120 may address the beam failure associated with TRP A by utilizing the given candidate beam to communicate with TRP A.

In some aspects, the one or more of the multiple TRPs may be configured with the same random-access channel (RACH) resources and with a given reference signal received power (RSRP) threshold. Alternatively, the one or more of the multiple TRPs may be configured separately such that the one or more of the multiple TRPs may be configured with respective RACH resources and respective RSRP thresholds. In some aspects, the configuration information may associate the RACH resources and/or the RSRP thresholds configured for a given TRP with a CORESET pool index associated with the given TRP. In some aspects, for the given TRP, the UE 120 may configure the UE 120 to identify one or more candidate beams based at least in part on the RACH resources configured for the given TRP and/or a measure associated with the one or more candidate beams failing to satisfy the RSRP threshold (e.g., the measure is lower than the RSRP threshold) configured for the given TRP.

In some aspects, the configuration information may include a scheduling request (SR) configuration to configure the UE 120 to transmit an SR to the BS 810. In some aspects, a master cell group associated with the UE 120 may be configured with a respective SR configuration. In some aspects, the UE 120 may receive the SR configuration via a network message such as an RRC message. Based at least in part on determining that beam A associated with TRP A has failed, the UE 120 may configure the UE 120 to transmit an SR utilizing a network resource associated with a working TRP (e.g., TRP B). In some aspects, the network resource may include an uplink grant associated with TRP B. In some aspects, the network resource may include a dedicated physical uplink control channel (PUCCH) resource associated with TRP B. In some aspects, the UE 120 may be enabled to enhance the SR configuration by configuring one or more PUCCH resources to support transmission of information associated with one or more spatial relations. In one example, one or more PUCCH resources may be configured to support transmission of respective spatial relation information. In another example, a single PUCCH resource may be configured to support transmission of information associated with two or more spatial relations.

In some aspects, the configuration information may include a recovery search space configuration to be utilized by the UE 120 to configure the UE 120 to perform a RACH-based BFR procedure. Based at least in part on the recovery search space configuration, the UE 120 may configure the UE 120 to monitor a recovery search space in a physical downlink control channel (PDCCH) to receive information associated with performing the RACH-based BFR procedure. In some aspects, the multiple TRPs may share a recovery search space, and the UE 120 may be configured to monitor the shared recovery search space to receive information associated with performing the RACH-based BFR procedure for one or more of the multiple TRPs. In some aspects, the one or more of the multiple TRPs may be configured with respective recovery search spaces in the PDCCH, and the UE 120 may be configured to monitor the respective recovery search spaces to receive information associated with performing the RACH-based BFR procedure for the one or more of the multiple TRPs. In some aspects, the information associated with performing the RACH-based BFR procedure may include identification information associated with a special cell (SpCell) including the one or more of the multiple TRPs. In some aspects, the information may include identification information associated with a given TRP for which the RACH-based BFR procedure is to be performed.

As shown by reference number 850, the UE 120 may perform the BFD and/or BFR.

Figure 9:
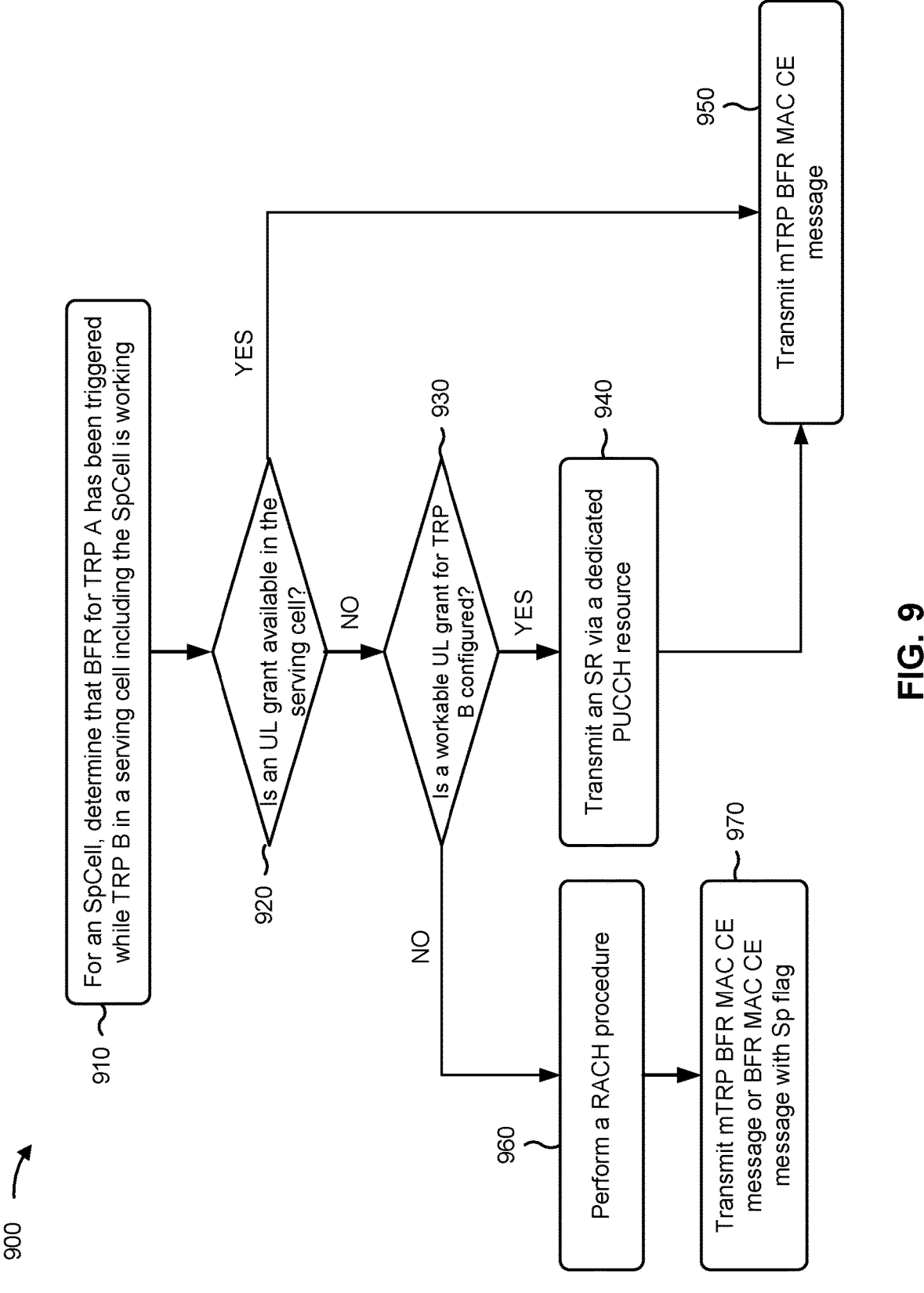
FIG. 9 is a diagram illustrating an example associated with beam recovery during multi-TRP operation, in accordance with various aspects of the present disclosure.

For instance, as shown in example 900 of FIG. 9, the UE 120 may perform BFR based at least in part on determining that BFR for a given TRP (e.g., TRP A) in an SpCell has been triggered while another TRP (e.g., TRP B) in a serving cell including the SpCell is working (block 910). In this case, the UE 120 may perform the BFR to perform independent beam recovery with respect to TRP A. The UE 120 may determine whether an uplink grant is available (block 920). In some aspects, the network uplink grant may be associated with a network resource that may be provided by a serving cell, which may include the SpCell and one or more secondary cells (SCells). If the uplink grant is available (block 920—YES), the UE 120 may transmit a multi-TRP BFR medium access control message including a control element (mTRP BFR MAC CE message) to the BS in the SpCell (block 950). In some aspects, the control element (CE) may indicate information regarding an index (e.g., CORESET pool index) associated with TRP A. In some aspects, the mTRP BFR MAC CE message may indicate a preferred beam to utilize to communicate with TRP A. In some aspects, the preferred beam may include one or more of the candidate beams identified by the UE 120 from among the plurality of recovery candidate beams configured for TRP A, as discussed above with respect to FIG. 8.

If the uplink grant is unavailable (block 920—NO), the UE 120 may determine whether a workable uplink associated with TRP B is configured (block 930). In some aspects, the workable uplink associated with TRP B may be configured when, for example, information associated with a spatial relation is configured for one or more uplink channels (e.g., PUCCH, PUSCH) associated with TRP B. If the workable uplink associated with TRP B is configured (block 930—YES), the UE 120 may transmit a scheduling request (SR) via a dedicated PUCCH resource to the BS in the SpCell (block 940) to request permission to utilize the uplink grant associated with TRP B. Based at least in part on transmitting the SR, the UE 120 may receive permission and information to enable the UE 120 to utilize the uplink grant associated with TRP B. The UE 120 may utilize the uplink grant associated with TRP B to transmit the mTRP BFR MAC CE message (block 950). If the uplink grant associated with TRP B is not configured (block 930—NO), the UE 120 may perform a RACH procedure for beam recovery (block 960). In some aspects, the UE 120 may perform a two-step RACH procedure and transmit the mTRP BFR MAC CE message via msgA. In some aspects, the UE 120 may perform a four-step RACH procedure and transmit the mTRP BFR MAC CE message via msg3. Alternatively to transmitting the mTRP BFR MAC CE message, the UE 120 may transmit a BFR medium access control message including a control element (CE) (e.g., BFR MAC CE message) including an Sp flag indicating a cell associated with TRP A in which the beam failure is detected (block 970).

Figure 10:
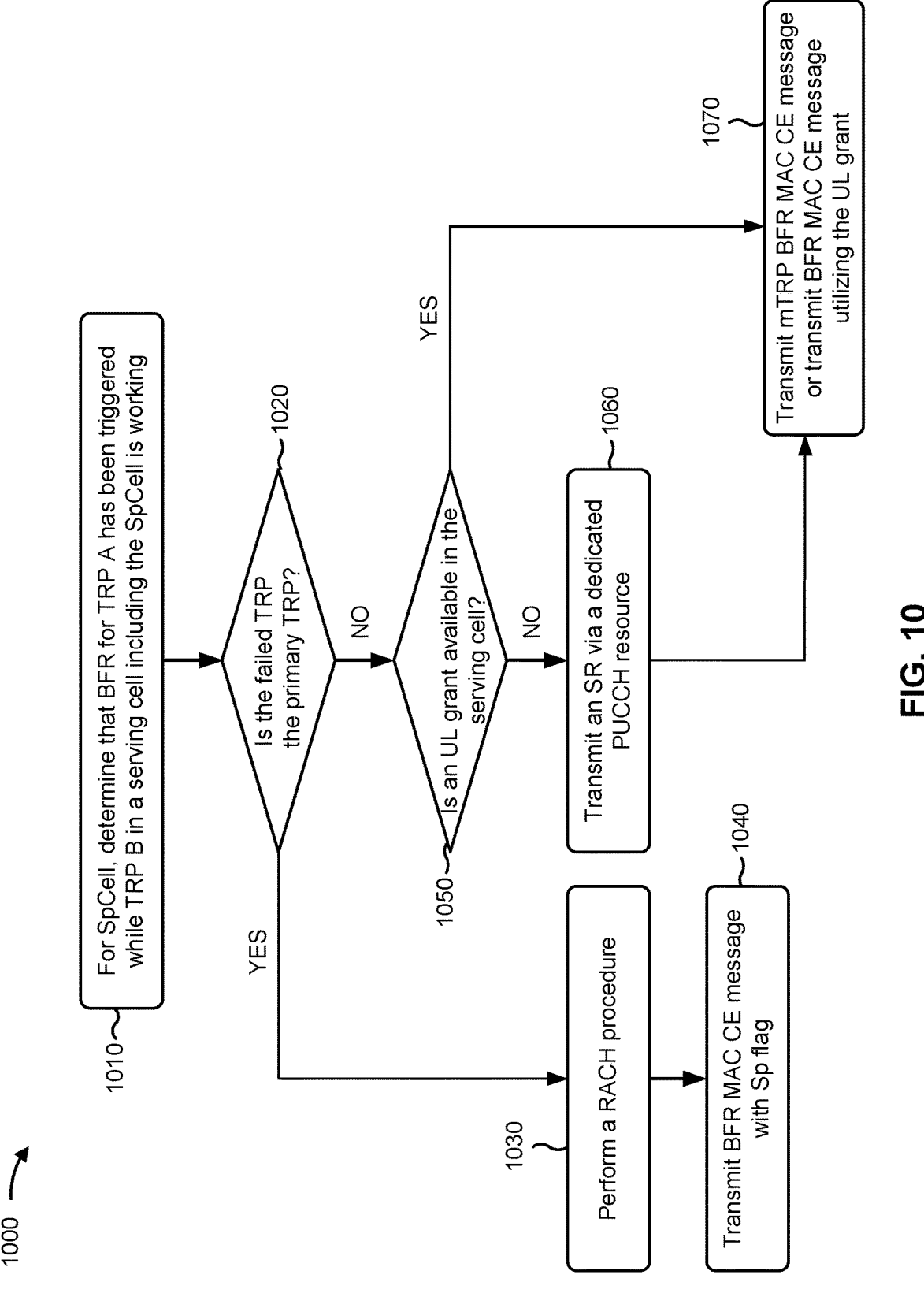
FIG. 10 is a diagram illustrating an example associated with beam recovery during multi-TRP operation, in accordance with various aspects of the present disclosure.

In some aspects, as shown in example 1000 of FIG. 10 the UE 120 may perform BFR based at least in part on determining that BFR for a given TRP (e.g., TRP A) in an SpCell has been triggered while another TRP (e.g., TRP B) in a serving cell including the SpCell is working (block 1010). The UE 120 may determine whether TRP A is a primary TRP (block 1020). In some aspects, TRP A may be the primary TRP because the UE 120 may have performed an initial connection establishment procedure with TRP A or may have initiated a connection re-establishment procedure with TRP A. In some aspects, the BS in the SpCell may have designated TRP A to serve as the primary TRP. If the UE 120 determines that TRP A is the primary TRP (block 1020—YES), the UE 120 may perform a RACH procedure for beam recovery (block 1030). In some aspects, the UE 120 may perform a two-step RACH procedure and transmit, via msgA, a BFR MAC CE message including an Sp flag indicating a cell associated with TRP A in which the beam failure is detected(block 1040). In some aspects, the UE 120 may perform a four-step RACH procedure and transmit, via msg3, the BFR MAC CE message including the Sp flag indicating a cell associated with TRP A in which the beam failure is detected (block 1040).

If the UE 120 determines that TRP A is not the primary TRP (block 1050—NO), the UE 120 may determine whether an uplink grant is available (block 1050). In some aspects, the uplink grant may be associated with a network resource that may be provided by the serving cell, which may include the SpCell and one or more secondary cells (SCells). In some aspects, the uplink grant may be associated with a network resource configured for TRP B. If the UE 120 determines that the uplink grant is available (block 1050—

YES), the UE 120 may utilize the uplink grant to transmit a mTRP BFR MAC CE message (block 1070). In some aspects, the mTRP BFR MAC CE message may include a control element (CE) indicating information regarding an index (e.g., CORESET pool index) associated with TRP A. In some aspects, the CE may indicate a preferred beam to utilize to communicate with TRP A. In some aspects, the preferred beam may include one or more candidate beams identified by the UE 120 from among the plurality of recovery candidate beams configured for TRP A, as discussed above with respect to FIG. 8. Alternatively, the UE 120 may utilize the uplink grant to transmit a BFR MAC CE message (block 1070).

If the UE 120 determines that the network uplink grant is unavailable (block 1050—NO), the UE 120 may transmit an SR utilizing a dedicated PUCCH resource (block 1060). Based at least in part on transmitting the SR, the UE 120 may receive information regarding an available uplink grant associated with the serving cell and/or associated with TRP B. The UE 120 may utilize the uplink grant to transmit the mTRP BFR MAC CE message (block 1070). Alternatively, the UE 120 may utilize the uplink grant to transmit the BFR MAC CE message including the Sp flag indicating a cell associated with TRP A in which the beam failure is detected (block 1070). In some aspects, the BFR MAC CE message may include information indicating the preferred beam to utilize to communicate with TRP A.

Figure 11:
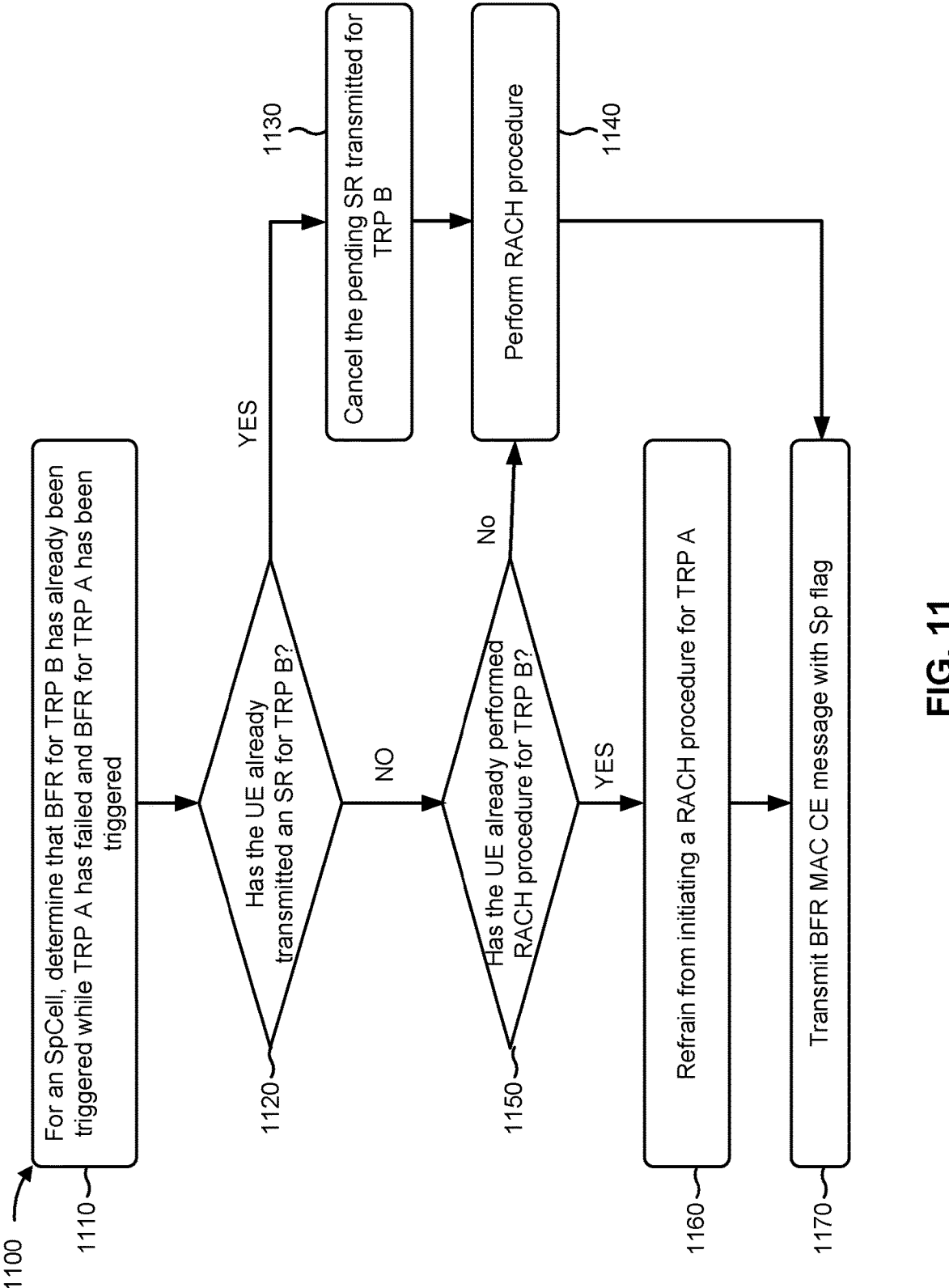
FIG. 11 is a diagram illustrating an example associated with beam recovery during multi-TRP operation, in accordance with various aspects of the present disclosure.

In some aspects, as shown in example 1100 of FIG. 11, the UE 120 may perform BFR based at least in part on determining that, in an SpCell, a BFR procedure for TRP B has already been triggered while TRP A has failed and a BFR procedure for TRP A has been triggered (block 1110). The UE 120 may determine whether the UE 120 has already transmitted an SR during the BFR procedure for TRP B (block 1120). In some aspects, the UE 120 may have transmitted the SR via a dedicated PUCCH resource. If the UE 120 determines that the UE 120 has already transmitted the SR (block 1120—YES), the UE 120 may cancel the SR transmitted and pending for TRP B (block 1130). The UE 120 may perform a RACH procedure for beam recovery (block 1140). In some aspects, the UE 120 may perform a two-step RACH procedure or may perform a four-step RACH procedure. If the UE 120 performs the two-step RACH procedure, the UE 120 may transmit, via msgA, a BFR MAC CE message including an Sp flag indicating a cell associated with TRP A in which the beam failure is detected (block 1170). If the UE 120 performs the four-step RACH procedure, the UE 120 may transmit, via msg3, the BFR MAC CE message including the Sp flag indicating a cell associated with TRP A in which the beam failure is detected (block 1170).

If the UE 120 determines that the UE 120 has not yet transmitted the SR for TRP B (block 1120—NO), the UE 120 may determine whether the UE 120 has already performed a RACH procedure for TRP B (block 1150). If the UE 120 determines that the UE 120 has not yet performed the RACH procedure for TRP B (block 1150—NO), the UE may perform the RACH procedure, as discussed above with respect to block 1140. If the UE 120 determines that the UE 120 has already performed the RACH procedure for TRP B (block 1150—YES), the UE 120 may refrain from initiating a RACH procedure for TRP A (block 1160). The UE 120 may transmit the BFR MAC CE message including the Sp flag, as discussed above with respect to block 1170.

Figure 12:
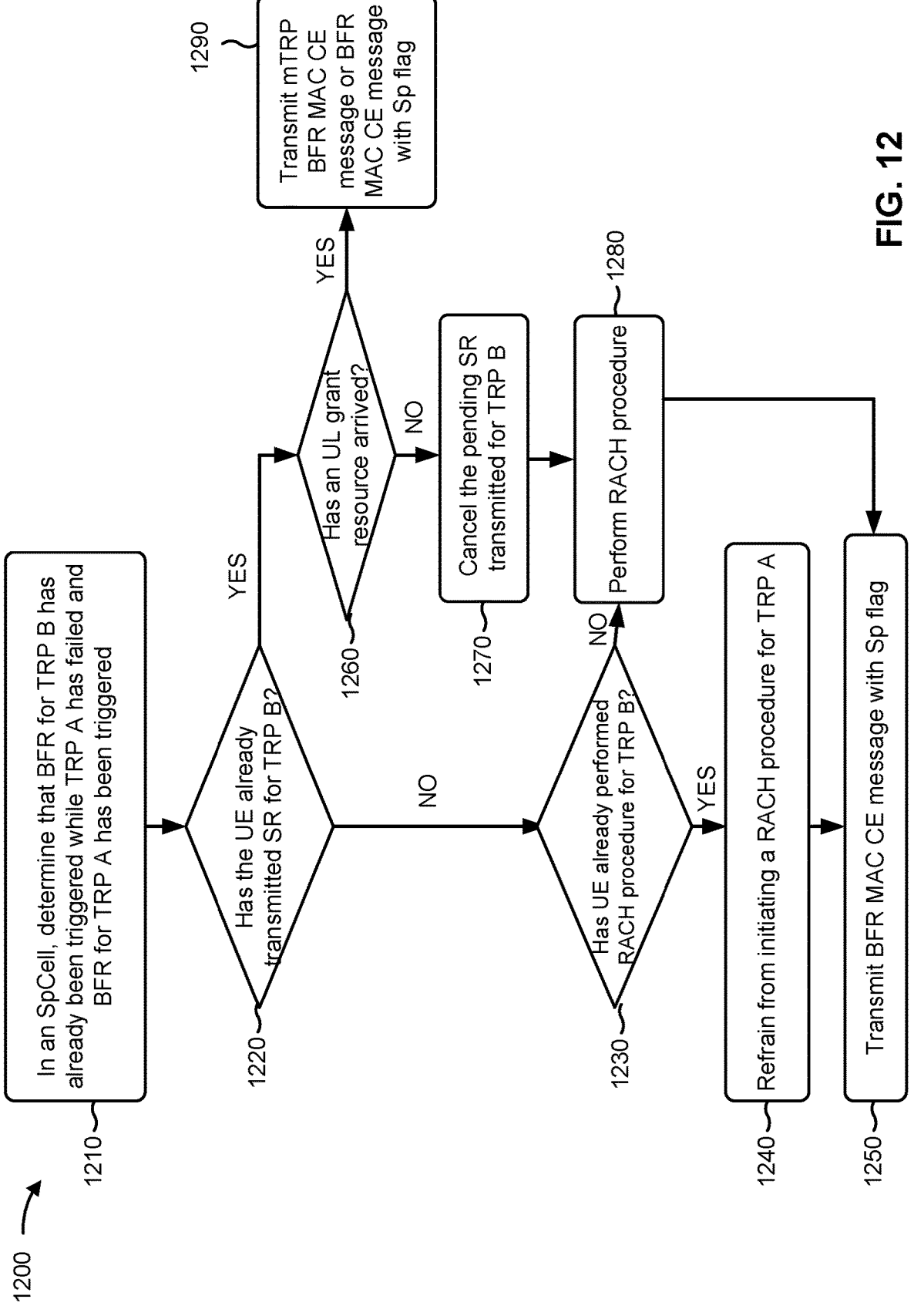
FIG. 12 is a diagram illustrating an example associated with beam recovery during multi-TRP operation, in accordance with various aspects of the present disclosure.

In some aspects, as shown in example 1200 of FIG. 12, the UE 120 may perform BFR based at least in part on determining that, in an SpCell, a BFR procedure for TRP B has already been triggered while TRP A has failed and a BFR procedure for TRP A has been triggered (block 1210). The UE 120 may determine whether the UE 120 has already transmitted an SR during the BFR procedure for TRP B (block 1220). In some aspects, the UE 120 may have transmitted the SR via a dedicated PUCCH resource. If the UE 120 determines that the UE 120 has already transmitted the SR (block 1220—YES), the UE 120 may determine whether an uplink grant resource has arrived (e.g., has been received) for utilization by the UE 120 (block 1260). If the UE 120 determines that the uplink grant resource has arrived (block 1260—YES), the UE 120 may transmit a mTRP BFR MAC CE message to the BS in the SpCell (block 1290). In some aspects, the mTRP BFR MAC CE message may include a CE indicating information regarding an index (e.g., CORESET pool index) associated with TRP A and information regarding an index (e.g., CORESET pool index) associated with TRP B. In some aspects, the CE may indicate one or more preferred beams to utilize to communicate with TRP A and/or with TRP B. In some aspects, the one or more preferred beams may include one or more candidate beams identified by the UE 120 from among the plurality of recovery candidate beams configured for TRP A and/or for TRP B, as discussed above with respect to FIG. 8. Alternatively, the UE 120 may transmit a BFR MAC CE message including an Sp flag indicating a cell associated with TRP A in which the beam failure is detected (block 1290).

If the UE 120 determines that the uplink grant resource has not yet arrived (block 1260—NO), the UE 120 may cancel the SR transmitted and pending for TRP B (block 1270). The UE 120 may perform a RACH procedure for beam recovery (block 1280). In some aspects, the UE 120 may perform a two-step RACH procedure or may perform a four-step RACH procedure. If the UE 120 performs the two-step RACH procedure, the UE 120 may transmit, via msgA, a BFR MAC CE message including an Sp flag indicating a cell associated with TRP A in which the beam failure is detected. If the UE 120 performs the four-step RACH procedure, the UE 120 may transmit, via msg3, the BFR MAC CE message including the Sp flag indicating a cell associated with TRP A in which the beam failure is detected.

If the UE 120 determines that the UE 120 has not yet transmitted the SR for TRP B (block 1220—NO), the UE 120 may determine whether the UE 120 has already performed the RACH procedure for TRP B (block 1230). If the UE 120 determines that the UE 120 has not yet performed the RACH procedure for TRP B (block 1230—NO), then the UE 120 may perform the RACH procedure, as discussed above with respect to block 1280. If the UE 120 determines that the UE 120 has already performed the RACH procedure for TRP B (block 1230—YES), the UE 120 may refrain from initiating a RACH procedure for TRP A (block 1240). The UE 120 may transmit the BFR MAC CE message including the Sp flag indicating a cell associated with TRP A in which the beam failure is detected (block 1250).

In some aspects, as shown in example 1300 of FIG. 13, the UE 120 may perform BFR based at least in part on determining that, in an SCell, a BFR procedure for TRP B has already been triggered while TRP A has failed and a BFR procedure for TRP A has been triggered (block 1310). The UE 120 may determine whether a network uplink grant is available in a serving cell including the SCell (block 1320). If the UE 120 determines that the network uplink grant is available (block 1320—YES), then the UE 120 may utilize the network uplink grant to transmit a mTRP BFR MAC CE message to the BS in the SCell (block 1330). In some aspects, the mTRP BFR MAC CE message may include a control element (CE) indicating information regarding an index (e.g., CORESET pool index) associated with TRP A and information regarding an index (e.g., CORESET pool index) associated with TRP B. In some aspects, the CE may indicate one or more preferred beams to utilize to communicate with TRP A and/or with TRP B. In some aspects, the one or more preferred beams may include one or more candidate beams identified by the UE 120 from among the plurality of recovery candidate beams configured for TRP A and/or for TRP B, as discussed above with respect to FIG. 8.

If the UE 120 determines that the network uplink grant is unavailable (block 1320—NO), the UE 120 may refrain from transmitting an SR for TRP A based at least in part on determining that the UE 120 has already transmitted an SR for TRP B (block 1340). The UE 120 may determine whether the UE 120 is configured for multi-TRP operation in a plurality of SCells included in the serving cell (block 1350). If the UE 120 determines that the UE 120 is configured for multi-TRP operation in the plurality of SCells (block 1350—YES), the UE 120 may transmit the mTRP BFR MAC CE message, as discussed above with respect to block 1330. If the UE 120 determines that the UE 120 is not configured for multi-TRP operation in the plurality of SCells (block 1350—NO), and is configured for single-TRP operation in the SCell, the UE 120 may transmit a BFR MAC CE message including information to report per SCell beam failure information (block 1360).

Techniques and apparatuses for providing beam recovery during multi-TRP operation, as described herein, may enable the UE to independently detect and address a beam failure associated with a TRP, from among one or more of the multiple TRPs in communication with the UE. For instance, when a given beam associated with a given TRP fails, the UE may perform independent BFD and/or BFR to recover the given beam. As a result, the UE may efficiently utilize internal resources (e.g., processing power, utilization of memory space, power consumption, or the like) and external resources (e.g., network resources, BS resources, or the like) while performing the BFD and/or BFR. The UE may also be enabled to utilize an uplink grant associated with another beam related to another TRP, from among the one or more of the multiple TRPs, to inform the BS of failure associated with the given beam. As a result, the UE may avoid a delay in performing BFR. In this way, the UE may be enabled to efficiently restore a connection with the BS.

As indicated above, FIGS. 8-13 are provided as examples. Other examples may differ from what is described with regard to FIGS. 8-13.

Figure 14:
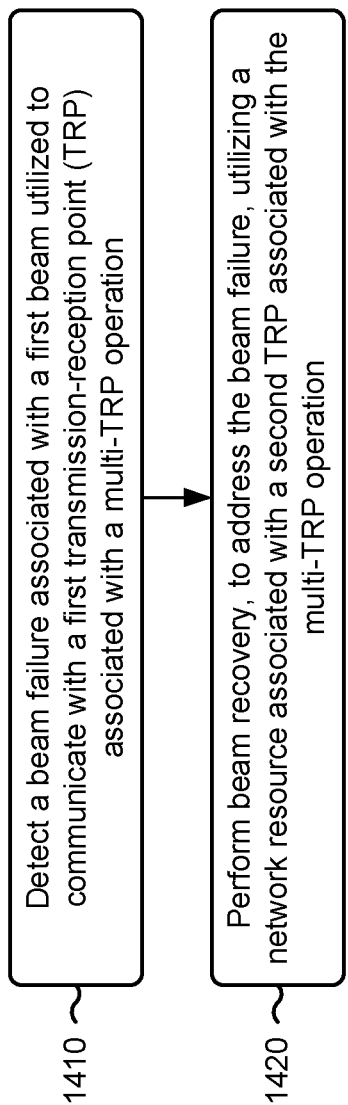
FIG. 14 is a diagram illustrating an example process associated with beam recovery during multi-TRP operation, in accordance with various aspects of the present disclosure.

FIG. 14 is a diagram illustrating an example process 1400 performed, for example, by a UE, in accordance with various aspects of the present disclosure. Example process 1400 is an example where the UE (e.g., UE 120) performs operations associated with beam recovery during multi-TRP operation.

As shown in FIG. 14, in some aspects, process 1400 may include detecting a beam failure associated with a first beam utilized to communicate with a first TRP associated with a multi-TRP operation (block 1410). For example, the UE (e.g., using BFD component 1508, depicted in FIG. 15) may detect a beam failure associated with a first beam utilized to communicate with a first TRP associated with a multi-TRP operation, as described above.

As further shown in FIG. 14, in some aspects, process 1400 may include performing beam recovery, to address the beam failure, utilizing a network resource associated with a second TRP associated with the multi-TRP operation (block 1420). For example, the UE (e.g., using BFR component 1510, depicted in FIG. 15) may perform beam recovery, to address the beam failure, utilizing a network resource associated with a second TRP associated with the multi-TRP operation, as described above.

Process 1400 may include additional aspects, such as any single aspect or any combination of aspects described below and/or in connection with one or more other processes described elsewhere herein.

In a first aspect, process 1400 includes receiving one or more beam failure detection (BFD) parameters for the first TRP or the second TRP, and configuring the UE to detect the beam failure based at least in part on the one or more BFD parameters.

In a second aspect, alone or in combination with the first aspect, detecting the beam failure includes independently performing a BFD procedure for the first TRP.

In a third aspect, alone or in combination with one or more of the first and second aspects, process 1400 includes associating a first detection resource configured for the first TRP with a first index related to the first TRP, configuring the UE to detect the beam failure associated with the first beam based at least in part on associating the first detection resource with the first index, associating a second detection resource configured for the second TRP with a second index related to the second TRP, and configuring the UE to detect a beam failure associated with a second beam utilized to communicate with the second TRP based at least in part on associating the second detection resource with the second index.

In a fourth aspect, alone or in combination with one or more of the first through third aspects, process 1400 includes quasi co-locating a first index with a first reference signal associated with the first TRP, configuring the UE to detect the beam failure associated with the first beam based at least in part on quasi co-locating the first index with the first reference signal, quasi co-locating a second index with a second reference signal associated with the second TRP, and configuring the UE to detect a beam failure associated with a second beam utilized to communicate with the second TRP based at least in part on quasi co-locating the second index with the second reference signal.

In a fifth aspect, alone or in combination with one or more of the first through fourth aspects, the first TRP and the second TRP are configured with a respective plurality of candidate beams for recovery.

In a sixth aspect, alone or in combination with one or more of the first through fifth aspects, performing the beam recovery includes identifying a first candidate beam, from a plurality of candidate beams configured for the first TRP, to utilize to communicate with the first TRP.

In a seventh aspect, alone or in combination with one or more of the first through sixth aspects, performing the beam recovery includes using a beam failure recovery configuration configured for the first TRP to perform the beam recovery.

In an eighth aspect, alone or in combination with one or more of the first through seventh aspects, the beam failure recovery configuration is associated with a random access channel (RACH) resource, a plurality of candidate beams, or a reference signal received power (RSRP) threshold associated with the first TRP.

In a ninth aspect, alone or in combination with one or more of the first through eighth aspects, process 1400 includes receiving a scheduling request (SR) configuration, corresponding to performing the beam recovery, via a network message.

In a tenth aspect, alone or in combination with one or more of the first through ninth aspects, process 1400 includes enhancing the SR configuration by configuring one or more physical uplink control channel (PUCCH) resources to support one or more spatial relations.

In an eleventh aspect, alone or in combination with one or more of the first through tenth aspects, process 1400 includes enhancing the SR configuration by configuring a plurality of PUCCH resources, each PUCCH resource configured to support a respective spatial relation.

In a twelfth aspect, alone or in combination with one or more of the first through eleventh aspects, performing the beam recovery includes transmitting, based at least in part on detecting the beam failure, a scheduling request (SR) via a dedicated PUCCH resource associated with the second TRP.

In a thirteenth aspect, alone or in combination with one or more of the first through twelfth aspects, process 1400 includes monitoring a recovery search space configured for the first TRP, the recovery search space being associated with a physical downlink control channel (PDCCH), and receiving information, via the recovery search space on the PDCCH, to use to perform the beam recovery.

In a fourteenth aspect, alone or in combination with one or more of the first through thirteenth aspects, the first TRP and the second TRP are associated with a special cell (SpCell).

In a fifteenth aspect, alone or in combination with one or more of the first through fourteenth aspects, performing the beam recovery includes indicating, based at least in part on detecting the beam failure, a preferred beam to utilize to communicate with the first TRP.

In a sixteenth aspect, alone or in combination with one or more of the first through fifteenth aspects, performing the beam recovery includes indicating, via a multi-TRP medium access control (mTRP BFR MAC CE) message, a preferred beam to utilize to communicate with the first TRP.

In a seventeenth aspect, alone or in combination with one or more of the first through sixteenth aspects, performing the beam recovery includes transmitting, based at least in part on detecting the beam failure, a scheduling request (SR) to request an uplink grant associated with the second TRP.

In an eighteenth aspect, alone or in combination with one or more of the first through seventeenth aspects, performing the beam recovery includes transmitting, based at least in part on determining that a workable uplink is configured for the second TRP, a scheduling request (SR) to request an uplink grant associated with the second TRP.

In a nineteenth aspect, alone or in combination with one or more of the first through eighteenth aspects, performing the beam recovery includes transmitting, based at least in part on determining that a PUCCH resource is configured to support a spatial relation, a scheduling request (SR) to request an uplink grant associated with the second TRP.

In a twentieth aspect, alone or in combination with one or more of the first through nineteenth aspects, performing the beam recovery includes transmitting a multi-TRP medium access control (mTRP BFR MAC CE) message utilizing an uplink grant associated with the second TRP, the mTRP BFR MAC CE message indicating a first index associated with the first TRP and a preferred beam to utilize to communicate with the first TRP.

In a twenty-first aspect, alone or in combination with one or more of the first through twentieth aspects, performing the beam recovery includes performing, based at least in part on determining that a workable uplink is not configured for the second TRP, a RACH procedure to perform the beam recovery.

In a twenty-second aspect, alone or in combination with one or more of the first through twenty-first aspects, performing the beam recovery includes transmitting, based at least in part on determining that a workable uplink is not configured for the second TRP and during performance of a RACH procedure, a multi-TRP medium access control (mTRP BFR MAC CE) message in a RACH message, the mTRP BFR MAC CE message indicating a first index associated with the first TRP and a preferred beam to utilize to communicate with the first TRP.

In a twenty-third aspect, alone or in combination with one or more of the first through twenty-second aspects, process 1400 includes transmitting, based at least in part on determining that a workable uplink is not configured for the second TRP, a medium access control (MAC) message indicating a special cell (SpCell) associated with the first TRP.

In a twenty-fourth aspect, alone or in combination with one or more of the first through twenty-third aspects, the first TRP is a primary TRP, and performing the beam recovery includes performing a RACH procedure to perform the beam recovery.

In a twenty-fifth aspect, alone or in combination with one or more of the first through twenty-fourth aspects, the first TRP is a primary TRP, and performing the beam recovery includes performing a RACH procedure to perform the beam recovery, the RACH procedure including transmitting a RACH message to indicate a special cell (SpCell) associated with the first TRP.

In a twenty-sixth aspect, alone or in combination with one or more of the first through twenty-fifth aspects, the first TRP is a secondary TRP, and performing the beam recovery includes transmitting a scheduling request (SR) via a PUCCH resource to request an uplink grant associated with the second TRP, which is a primary TRP.

In a twenty-seventh aspect, alone or in combination with one or more of the first through twenty-sixth aspects, the first TRP is a secondary TRP, and performing the beam recovery includes transmitting, utilizing an uplink grant associated with the second TRP, a multi-TRP medium access control (mTRP BFR MAC CE) message indicating a first index associated with the first TRP and a preferred beam to utilize to communicate with the first TRP.

In a twenty-eighth aspect, alone or in combination with one or more of the first through twenty-seventh aspects, process 1400 includes detecting a beam failure associated with a second beam utilized to communicate with the second TRP, wherein performing the beam recovery includes transmitting, based at least in part on determining that a network uplink grant is available, a multi-TRP medium access control (mTRP BFR MAC CE) message utilizing the network uplink grant, the mTRP BFR MAC CE message indicating a first index associated with the first TRP, a second index associated with the second TRP, and a preferred beam to utilize to communicate with the first TRP or with the second TRP.

In a twenty-ninth aspect, alone or in combination with one or more of the first through twenty-eighth aspects, process 1400 includes detecting a beam failure associated with a second beam utilized to communicate with the second TRP, wherein performing the beam recovery includes canceling, regardless of an availability of an uplink grant, a scheduling request (SR) transmitted for the first TRP.

In a thirtieth aspect, alone or in combination with one or more of the first through twenty-ninth aspects, process 1400 includes detecting a beam failure associated with a second beam utilized to communicate with the second TRP, and transmitting, based at least in part on determining that a network uplink grant is available, a medium access control (MAC) message, utilizing the network uplink grant, indicating a special cell (SpCell) associated with the second TRP.

In a thirty-first aspect, alone or in combination with one or more of the first through thirtieth aspects, process 1400 includes detecting a beam failure associated with a second beam utilized to communicate with the second TRP, and canceling a pending schedule request (SR) associated with the first TRP based at least in part on determining that a network uplink grant is unavailable.

In a thirty-second aspect, alone or in combination with one or more of the first through thirty-first aspects, process 1400 includes detecting a beam failure associated with a second beam utilized to communicate with the second TRP, and transmitting, during performance of a RACH procedure, a medium access control (MAC) message indicating a special cell (SpCell) associated with the second TRP.

In a thirty-third aspect, alone or in combination with one or more of the first through thirty-second aspects, the first TRP and the second TRP are associated with a secondary cell (SCell).

In a thirty-fourth aspect, alone or in combination with one or more of the first through thirty-third aspects, performing the beam recovery includes transmitting, based at least in part on detecting a beam failure associated with a second beam utilized to communicate with the second TRP, a multi-TRP medium access control (mTRP BFR MAC CE) message by utilizing an available network uplink grant to indicating a secondary cell (SCell) associated with the second TRP.

In a thirty-fifth aspect, alone or in combination with one or more of the first through thirty-fourth aspects, process 1400 includes detecting a beam failure associated with a second beam utilized to communicate with the second TRP, wherein performing the beam recovery includes transmitting, based at least in part on determining configuration for a multi-TRP operation in a plurality of secondary cells, a multi-TRP medium access control (mTRP BFR MAC CE) message indicating a first preferred beam to utilize to communicate with the first TRP and a second referred beam to utilize to communicate with the second TRP.

In a thirty-sixth aspect, alone or in combination with one or more of the first through thirty-fifth aspects, process 1400 includes detecting a beam failure associated with a second beam utilized to communicate with the second TRP, wherein performing the beam recovery includes transmitting, based at least in part on determining configuration for a single-TRP operation in a plurality of secondary cells (SCells), a medium access control (MAC) message indicating a secondary cell (SCell) associated with the second TRP.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

Figure 15:
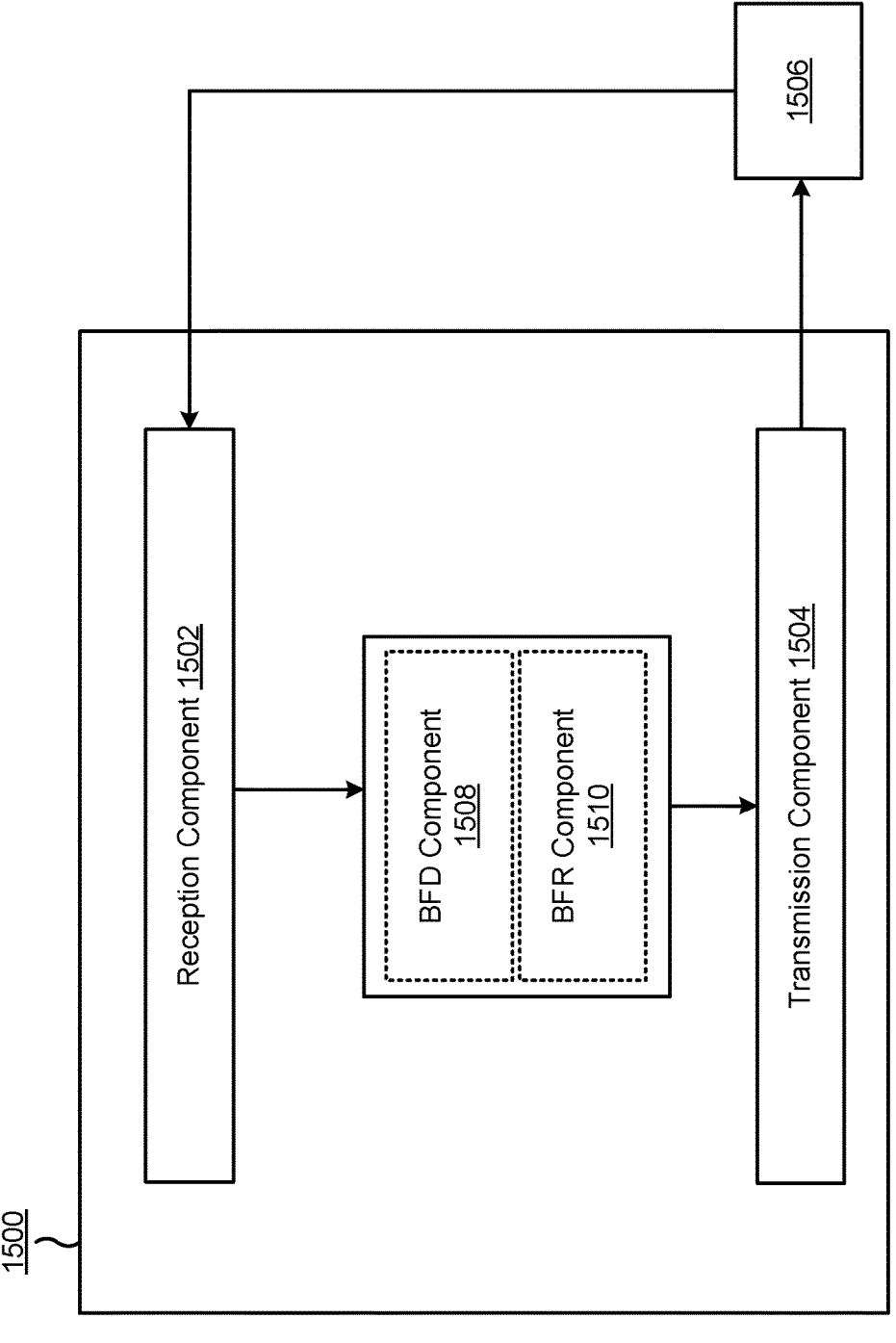
FIG. 15 is a diagram illustrating an example apparatus associated with beam recovery during multi-TRP operation, in accordance with various aspects of the present disclosure.

FIG. 15 is a block diagram of an example apparatus 1500 for wireless communication. The apparatus 1500 may be a UE, or a UE may include the apparatus 1500. In some aspects, the apparatus 1500 includes a reception component 1502 and a transmission component 1504, which may be in communication with one another (for example, via one or more buses and/or one or more other components). As shown, the apparatus 1500 may communicate with another apparatus 1506 (such as a UE, a base station, or another wireless communication device) using the reception component 1502 and the transmission component 1504. As further shown, the apparatus 1500 may include one or more of a BFD component 1508, a BFR component 1510, among other examples.

In some aspects, the apparatus 1500 may be configured to perform one or more operations described herein in connection with FIGS. 3-13. Additionally, or alternatively, the apparatus 1500 may be configured to perform one or more processes described herein, such as process 1400 of FIG. 14. In some aspects, the apparatus 1500 and/or one or more components shown in FIG. 15 may include one or more components of the UE described above in connection with FIG. 2. Additionally, or alternatively, one or more components shown in FIG. 15 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1502 may receive communications, such as reference signals, control information, data communications, or a combination thereof, from the apparatus 1506. The reception component 1502 may provide received communications to one or more other components of the apparatus 1500. In some aspects, the reception component 1502 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1506. In some aspects, the reception component 1502 may include one or more antennas, a demodulator, a MIMO detector, a receive processor, a controller/processor, a memory, or a combination thereof, of the UE described above in connection with FIG. 2.

The transmission component 1504 may transmit communications, such as reference signals, control information, data communications, or a combination thereof, to the apparatus 1506. In some aspects, one or more other components of the apparatus 1506 may generate communications and may provide the generated communications to the transmission component 1504 for transmission to the apparatus 1506. In some aspects, the transmission component 1504 may perform signal processing on the generated communications (such as filtering, amplification, modulation, digital-to-analog conversion, multiplexing, interleaving, mapping, or encoding, among other examples), and may transmit the processed signals to the apparatus 1506. In some aspects, the transmission component 1504 may include one or more antennas, a modulator, a transmit MIMO processor, a transmit processor, a controller/processor, a memory, or a combination thereof, of the UE described above in connection with FIG. 2. In some aspects, the transmission component 1504 may be co-located with the reception component 1502 in a transceiver.

The BFD component 1508 may detect a beam failure associated with a first beam utilized to communicate with a first transmission-reception point (TRP) associated with a multi-TRP operation. The BFR component 1510 may perform beam recovery, to address the beam failure, utilizing a network resource associated with a second TRP associated with the multi-TRP operation. The BFD component 1508 may include antenna 252, DEMOD 254, MIMO detector 256, receive processor 258, controller/processor 280, or the like. The BFR component 1510 may include antenna 252, DEMOD 254, MIMO detector 256, receive processor 258, controller/processor 280, or the like.

The reception component 1502 may receive one or more BFD parameters for the first TRP or the second TRP. The BFD component 1508 may configure the UE to detect the beam failure based at least in part on the one or more BFD parameters.

The BFD component 1508 may associate a first detection resource configured for the first TRP with a first index related to the first TRP.

The BFD component 1508 may configure the UE to detect the beam failure associated with the first beam based at least in part on associating the first detection resource with the first index.

The BFD component 1508 may associate a second detection resource configured for the second TRP with a second index related to the second TRP.

The BFD component 1508 may configure the UE to detect a beam failure associated with a second beam utilized to communicate with the second TRP based at least in part on associating the second detection resource with the second index.

The reception component 1502 may receive a scheduling request (SR) configuration, corresponding to performing the beam recovery, via a network message.

The BFR component 1510 may enhance the SR configuration by configuring one or more physical uplink control channel (PUCCH) resources to support one or more spatial relations.

The BFR component 1510 may enhance the SR configuration by configuring a plurality of physical uplink control channel (PUCCH) resources, each PUCCH resource configured to support a respective spatial relation.

The BFR component 1510 may monitor a recovery search space configured for the first TRP, the recovery search space being associated with a physical downlink control channel (PDCCH).

The reception component 1502 may receive information, via the recovery search space on the PDCCH, to use to perform the beam recovery.

The transmission component 1504 may transmit, based at least in part on determining that a workable uplink is not configured for the second TRP, a medium access control (MAC) message indicating a special cell (SpCell) associated with the first TRP.

The BFD component 1508 may detect a beam failure associated with a second beam utilized to communicate with the second TRP, and the transmission component 1504 may transmit, based at least in part on determining that a network uplink grant is available, a multi-TRP medium access control (mTRP BFR MAC CE) message utilizing the network uplink grant, the mTRP BFR MAC CE message indicating a first index associated with the first TRP, a second index associated with the second TRP, and a preferred beam to utilize to communicate with the first TRP or with the second TRP.

The BFD component 1508 may detect a beam failure associated with a second beam utilized to communicate with the second TRP, the BFR component 1510 may perform the beam recovery including canceling, regardless of an availability of an uplink grant, a scheduling request (SR) transmitted for the first TRP.

The BFD component 1508 may detect a beam failure associated with a second beam utilized to communicate with the second TRP.

The transmission component 1504 may transmit, based at least in part on determining that a network uplink grant is available, a medium access control (MAC) message, utilizing the network uplink grant, indicating a special cell (SpCell) associated with the second TRP.

The BFD component 1508 may detect a beam failure associated with a second beam utilized to communicate with the second TRP.

The BFR component 1510 may cancel a pending schedule request (SR) associated with the first TRP based at least in part on determining that a network uplink grant is unavailable.

The BFD component 1508 may detect a beam failure associated with a second beam utilized to communicate with the second TRP.

The transmission component 1504 may transmit, during performance of a random access channel (RACH) procedure, a medium access control (MAC) message indicating a special cell (SpCell) associated with the second TRP.

The BFD component 1508 may detect a beam failure associated with a second beam utilized to communicate with the second TRP, the BFR component 1510 performing the beam recovery including transmitting, based at least in part on determining configuration for a multi-TRP operation in a plurality of secondary cells, a multi-TRP medium access control (mTRP BFR MAC CE) message indicating a first preferred beam to utilize to communicate with the first TRP and a second referred beam to utilize to communicate with the second TRP.

The BFD component 1508 may detect a beam failure associated with a second beam utilized to communicate with the second TRP, the BER component 1510 performing the beam recovery including transmitting, based at least in part on determining configuration for a single-TRP operation in a plurality of secondary cells (SCells), a medium access control (MAC) message indicating a secondary cell (SCell) associated with the second TRP.

The number and arrangement of components shown in FIG. 15 are provided as an example. In practice, there may be additional components, fewer components, different components, or differently arranged components than those shown in FIG. 15. Furthermore, two or more components shown in FIG. 15 may be implemented within a single component, or a single component shown in FIG. 15 may be implemented as multiple, distributed components. Additionally, or alternatively, a set of (one or more) components shown in FIG. 15 may perform one or more functions described as being performed by another set of components shown in FIG. 15

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

The invention claimed is:

1. A method of wireless communication performed by a user equipment (UE), comprising:

detecting a beam failure associated with a first beam utilized to communicate with a first transmission-reception point (TRP) associated with a multi-TRP operation; and performing beam recovery, to address the beam failure and based at least in part on determining that a workable uplink is not configured for a second TRP associated with the multi-TRP operation, utilizing a network resource associated with a second TRP associated with the multi-TRP operation, comprising one or more of:

performing a random access channel (RACH) procedure to perform the beam recovery;

transmitting, during performance of the RACH procedure, a multi-TRP medium access control (mTRP BFR MAC CE) message in a RACH message, the mTRP BFR MAC CE message indicating a first index associated with the first TRP and a preferred beam to utilize to communicate with the first TRP; or transmitting a medium access control (MAC) message indicating a special cell (SpCell) associated with the first TRP.

2. The method of claim 1, wherein performing the beam recovery includes using a beam failure recovery configuration configured for the first TRP to perform the beam recovery.

3. The method of claim 1, further comprising:

receiving one or more beam failure detection (BFD) parameters for the first TRP or the second TRP; and configuring the UE to detect the beam failure based at least in part on the one or more BFD parameters.

4. The method of claim 1, further comprising:

independently performing, when detecting the beam failure, a beam failure detection (BFD) procedure for the first TRP.

5. The method of claim 1, further comprising:

associating a first detection resource configured for the first TRP with a first index related to the first TRP;

configuring the UE to detect the beam failure associated with the first beam based at least in part on associating the first detection resource with the first index;

associating a second detection resource configured for the second TRP with a second index related to the second TRP; and configuring the UE to detect a beam failure associated with a second beam utilized to communicate with the second TRP based at least in part on associating the second detection resource with the second index.

6. The method of claim 1, wherein the first TRP and the second TRP are configured with a respective plurality of candidate beams for recovery.

7. The method of claim 1, further comprising:

identifying, when performing the beam recovery, a first candidate beam, from a plurality of candidate beams configured for the first TRP, to utilize to communicate with the first TRP.

8. The method of claim 1, further comprising:

indicating, when performing the beam recovery, based at least in part on detecting the beam failure, and via a multi-TRP medium access control (mTRP MAC) message, a preferred beam to utilize to communicate with the first TRP.

9. The method of claim 1, further comprising:

transmitting, when performing the beam recovery and based at least in part on detecting the beam failure, a scheduling request (SR) to request an uplink grant associated with the second TRP.

10. The method of claim 1, wherein performing the beam recovery further comprises:

transmitting, based at least in part on detecting the beam failure, a scheduling request (SR) via a dedicated physical uplink control channel (PUCCH) resource associated with the second TRP.

11. A user equipment (UE) for wireless communication, comprising:

memory;

one or more processors coupled to the memory; and instructions stored in the memory and operable, when executed by the one or more processors, to cause the UE to:

detect a beam failure associated with a first beam utilized to communicate with a first transmission-reception point (TRP) associated with a multi-TRP operation; and perform beam recovery, to address the beam failure and based at least in part on determining that a workable uplink is not configured for a second TRP associated with the multi-TRP operation, utilizing a network resource associated with a second TRP associated with the multi-TRP operation, comprising one or more of perform a random access channel (RACH) procedure to perform the beam recovery;

transmit, during performance of the RACH procedure, a multi-TRP medium access control (mTRP BFR MAC CE) message in a RACH message, the mTRP BFR MAC CE message indicating a first index associated with the first TRP and a preferred beam to utilize to communicate with the first TRP; or transmit a medium access control (MAC) message indicating a special cell (SpCell) associated with the first TRP.

12. The UE of claim 11, wherein the one or more processors are further configured to:

receive one or more beam failure detection (BFD) parameters for the first TRP or the second TRP; and configure the UE to detect the beam failure based at least in part on the one or more BFD parameters.

13. The UE of claim 11, wherein the one or more processors, when detecting the beam failure, are configured to independently perform a beam failure detection (BFD) procedure for the first TRP.

14. The UE of claim 11, wherein the one or more processors are further configured to:

associate a first detection resource configured for the first TRP with a first index related to the first TRP;

configure the UE to detect the beam failure associated with the first beam based at least in part on associating the first detection resource with the first index;

associate a second detection resource configured for the second TRP with a second index related to the second TRP; and configure the UE to detect a beam failure associated with a second beam utilized to communicate with the second TRP based at least in part on associating the second detection resource with the second index.

15. The UE of claim 11, wherein the first TRP and the second TRP are configured with a respective plurality of candidate beams for recovery.

16. The UE of claim 11, wherein the one or more processors, when performing the beam recovery, are configured to identify a first candidate beam, from a plurality of candidate beams configured for the first TRP, to utilize to communicate with the first TRP.

17. The UE of claim 11, wherein the one or more processors are further configured to:

receive a scheduling request (SR) configuration, corresponding to performing the beam recovery, via a network message.

18. The UE of claim 17, wherein the one or more processors are further configured to enhance the SR configuration by configuring a plurality of physical uplink control channel (PUCCH) resources, each PUCCH resource configured to support a respective spatial relation.

19. The UE of claim 11, wherein the one or more processors, when performing the beam recovery, are configured to transmit, based at least in part on detecting the beam failure, a scheduling request (SR) via a dedicated physical uplink control channel (PUCCH) resource associated with the second TRP.

20. The UE of claim 11, wherein the one or more processors, when performing the beam recovery, are configured to indicate, based at least in part on detecting the beam failure and via a multi-TRP medium access control (mTRP MAC) message, a preferred beam to utilize to communicate with the first TRP.

21. The UE of claim 11, wherein the one or more processors, when performing the beam recovery, are configured to transmit, based at least in part on detecting the beam failure, a scheduling request (SR) to request an uplink grant associated with the second TRP.

22. The UE of claim 11, wherein the one or more processors, when performing the beam recovery, are configured to transmit, based at least in part on determining that a workable uplink is configured for the second TRP or that a physical uplink control channel (PUCCH) resource is configured to support a spatial relation, a scheduling request (SR) to request an uplink grant associated with the second TRP.

23. The UE of claim 11, wherein the one or more processors, when performing the beam recovery, are configured to transmit a multi-TRP medium access control (mTRP BFR MAC CE) message utilizing an uplink grant associated with the second TRP, the mTRP BFR MAC CE message indicating a first index associated with the first TRP and a preferred beam to utilize to communicate with the first TRP.

24. The UE of claim 11, wherein the one or more processors are further configured to detect a beam failure associated with a second beam utilized to communicate with the second TRP, wherein performing the beam recovery includes transmitting, based at least in part on determining that a network uplink grant is available, the mTRP BFR MAC CE message utilizing the network uplink grant, the mTRP BFR MAC CE message indicating a first index associated with the first TRP, a second index associated with the second TRP, and a preferred beam to utilize to communicate with the second TRP.

25. The UE of claim 11, wherein the one or more processors are further configured to detect a beam failure associated with a second beam utilized to communicate with the second TRP, wherein performing the beam recovery includes canceling a scheduling request (SR) transmitted for the first TRP.

26. The UE of claim 11, wherein the one or more processors are further configured to:
   detect a beam failure associated with a second beam utilized to communicate with the second TRP; and
   transmit, based at least in part on determining that a network uplink grant is available, a medium access control (MAC) message, utilizing the network uplink grant, indicating a special cell (SpCell) associated with the second TRP.

27. The UE of claim 11, wherein the one or more processors are further configured to:
   detect a beam failure associated with a second beam utilized to communicate with the second TRP; and
   transmit, during performance of the RACH procedure, the MAC message indicating the SpCell associated with the second TRP.

28. The UE of claim 11, wherein the one or more processors, when performing the beam recovery, are configured to transmit, based at least in part on detecting a beam failure associated with a second beam utilized to communicate with the second TRP, the mTRP BFR MAC CE message by utilizing an available network uplink grant to indicating a secondary cell (SCell) associated with the second TRP.

29. A user equipment (UE) for wireless communication, comprising:
   memory;
   one or more processors coupled to the memory; and
   instructions stored in the memory and operable, when executed by the one or more processors, to cause the UE to:
      detect a beam failure associated with a first beam utilized to communicate with a first transmission-reception point (TRP) associated with a multi-TRP operation;
      detect a beam failure associated with a second beam utilized to communicate with a second TRP associated with the multi-TRP operation; and
      perform beam recovery, to address the beam failure, utilizing a network resource associated with the second TRP,
   wherein the one or more processors, when performing the beam recovery, are configured to:
      transmit, based at least in part on determining configuration for a multi-TRP operation in a plurality of secondary cells, a multi-TRP medium access control (mTRP BFR MAC CE) message indicating a first preferred beam to utilize to communicate with the first TRP and a second preferred beam to utilize to communicate with the second TRP;
      transmit, based at least in part on determining configuration for a single-TRP operation in a plurality of secondary cells (SCells), a medium access control (MAC) message indicating a secondary cell (SCell) associated with the second TRP; or
      cancel a pending schedule request (SR) associated with the first TRP based at least in part on determining that a network uplink grant is unavailable.

30. A method of wireless communication performed by a user equipment (UE), comprising:
   detecting a beam failure associated with a first beam utilized to communicate with a first transmission-reception point (TRP) associated with a multi-TRP operation;
   detecting a beam failure associated with a second beam utilized to communicate with a second TRP associated with the multi-TRP operation; and
   performing beam recovery, to address the beam failure, utilizing a network resource associated with the second TRP, wherein performing the beam recovery comprises:
      transmitting, based at least in part on determining configuration for a multi-TRP operation in a plurality of secondary cells, a multi-TRP medium access control (mTRP BFR MAC CE) message indicating a first preferred beam to utilize to communicate with the first TRP and a second preferred beam to utilize to communicate with the second TRP;
      transmitting, based at least in part on determining configuration for a single-TRP operation in a plurality of secondary cells (SCells), a medium access control (MAC) message indicating a secondary cell (SCell) associated with the second TRP; or canceling a pending schedule request (SR) associated with the first TRP based at least in part on determining that a network uplink grant is unavailable.

\* \* \* \* \*